United States Patent
Kim et al.

(10) Patent No.: US 7,450,203 B2
(45) Date of Patent: Nov. 11, 2008

(54) DISPLAY APPARATUS WITH IMPROVED LUMINESCENCE

(75) Inventors: Jae-Hyun Kim, Seoul (KR); Yong-Kyu Jang, Gyeonggi-do (KR); Won-Sang Park, Gyeonggi-do (KR); Sang-Woo Kim, Gyeonggi-do (KR); Young-Ok Cha, Gyeonggi-do (KR); Sung-Eun Cha, Gyeongsangnam-do (KR); Jae-Young Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 312 days.

(21) Appl. No.: 11/506,951

(22) Filed: Aug. 18, 2006

(65) Prior Publication Data

US 2006/0279678 A1    Dec. 14, 2006

Related U.S. Application Data

(63) Continuation of application No. 10/796,375, filed on Mar. 8, 2004, now abandoned.

(30) Foreign Application Priority Data

Nov. 14, 2003    (KR) ............................... 2003-80523

(51) Int. Cl.
G02F 1/1335    (2006.01)
G02F 1/1343    (2006.01)

(52) U.S. Cl. ...................................... 349/114; 349/139
(58) Field of Classification Search ................. 349/114, 349/139

See application file for complete search history.

(56) References Cited

U.S. PATENT DOCUMENTS

| 6,330,047 B1 | 12/2001 | Kubo et al. |
| 6,620,655 B2 | 9/2003 | Ha et al. |
| 6,690,438 B2* | 2/2004 | Sekiguchi ................... 349/114 |
| 7,002,651 B2* | 2/2006 | Ha et al. ..................... 349/114 |
| 2003/0030768 A1 | 2/2003 | Sakamoto et al. |
| 2004/0201801 A1 | 10/2004 | Park et al. |
| 2005/0024559 A1 | 2/2005 | Okumura |

* cited by examiner

Primary Examiner—Mike Qi
(74) Attorney, Agent, or Firm—MacPherson Kwok Chen & Heid LLP

(57) ABSTRACT

The invention is directed to a liquid crystal display and assembly without a contact hole in the reflective layer. By eliminating the contact hole, the overall reflectance of the apparatus is increased. In order to prevent light leakage and afterimage, the invention includes an interface electrode that is strategically positioned over where light leakage occurs. An exemplary display apparatus includes a first substrate having a reflective region and a transmissive region including a transparent electrode, a second substrate including a transparent common electrode, a liquid crystal layer located between the first substrate and the second substrate, and a thin film transistor. The tin film transistor includes a gate electrode, a source electrode, and a drain electrode, and the gate electrode is located in the reflective region. Either the source electrode or the drain electrode contacts the transparent electrode between the reflective region and the transmissive region.

20 Claims, 25 Drawing Sheets

DISPLAY APPARATUS WITH IMPROVED LUMINESCENCE

RELATED APPLICATION

This application is a Continuation of U.S. patent application Ser. No. 10/796,375 filed on Mar. 8, 2004, now abandoned, which claims priority, under 35 USC § 119, from Korean Patent Application No. 2003-80523 filed on Nov. 14, 2003. The content of the Korean Patent Application is incorporated by reference herein in its entirety.

BACKGROUND OF THE INVENTION

1. Field of the Invention

The present invention relates to an array substrate, a method of manufacturing the array substrate and a liquid crystal display (LCD) apparatus having the array substrate. More particularly, the present invention relates to an array substrate capable of decreasing light leakage and afterimage and capable of increasing transmittance and reflectance, a method of manufacturing such array substrate, and an LCD apparatus having the array substrate.

2. Discussion of the Related Art

LCD apparatuses are well-known display devices. In LCD devices, images are displayed by controlling the transmission of light through a layer of liquid crystals. The liquid crystals change their orientation in response to electric field, and the orientation of the liquid crystals determines how much light passes through the liquid crystal layer. Thus, by controlling the voltage that is applied to electrodes surrounding the liquid crystal layer in a plurality of pixels, the desired image can be displayed.

The liquid crystals do not generate light on their own—they block or transmit light from a separate source. Thus, a typical LCD apparatus incorporates an internal light source, a reflective surface that allows utilization of light coming from a source external to the apparatus, or both. A transmissive-type LCD apparatus, which displays images by using an internal light source, requires a battery for power supply. This requirement for a battery is disadvantageous, as the battery increases the weight and the size of the LCD apparatus. A reflective-type LCD apparatus, which relies on an external source for light supply, does not need a battery. However, the reflective LCD apparatus suffers from another disadvantage of the device luminance depending on the amount of ambient light that is available. In a dark environment, for example, the reflective-type LCD apparatus will not demonstrate high luminance.

Reflective-transmissive-type LCD apparatuses that include both an internal light source and a reflective surface do not suffer either of the disadvantages described above to the extent that the reflective-type or the transmissive-type LCD apparatuses do. A reflective-transmissive-type LCD apparatus displays images by transmitting the light from the internal light source and reflecting any external light. The internal light source allows the apparatus to maintain a desired level of luminance regardless of the amount of ambient light that is available. At the same time, since the apparatus is able to utilize external light when external light is available, power is conserved and a large battery is not necessary.

FIGS. 1 and 2 show a conventional reflective-transmissive LCD apparatus 10. Although a backlight assembly that provides the internal light is part of the apparatus, it is not shown in the Figures. FIG. 1 is a plan view and FIG. 2 is a cross-sectional view taken along the line A-A' of FIG. 1. As shown in FIG. 1 and FIG. 2, the conventional LCD apparatus 10 has a contact hole.

The LCD apparatus 10 includes a first member 170, a second member 180, and a liquid crystal layer 108. The first member 170 includes a first substrate 100, a black matrix 102, a color filter 104, a first electrode 106, and a spacer 110. The second member 180 includes a second substrate 120, a thin film transistor 119, a gate insulating layer 126, a passivation layer 116, an organic layer 114, a second electrode 112 and a reflective electrode 113. Part of the organic layer 114 is removed to form an opening 129, which defines a transmissive region 150. The area outside the opening 129 that includes a thick layer of the organic layer 114 forms a reflective region 160. A contact hole 128 extends through the organic layer 114. The second member 180 has a pixel region 140 and a peripheral region 145. The transmissive region 150 and the reflective region 160 are located in the pixel region 140.

The liquid crystals in the LCD apparatus may be arranged in the mixed twisted nematic (MTN) mode or the homogeneous mode. In the MTN mode, the liquid crystals are twisted at an angle that is no greater than 90°. When the liquid crystals are arranged in the MTN mode, light is polarized to decrease light transmittance. When the liquid crystals are arranged in the homogeneous mode, the transmittance of the reflective-transmissive LCD apparatus increases. In a reflective-transmissive-type LCD apparatus with liquid crystals in the homogeneous mode, the light from the internal light source enters the liquid crystal layer from a second member 180, passes through the liquid crystals, and exits the LCD apparatus by passing through a first member 170. The externally provided light, on the other hand, reaches the liquid crystal layer through the first member 170 and is reflected back out of the apparatus by the reflective electrode 113.

The thin film transistor 119, which is disposed in the reflective region 160, includes a source electrode 118a, a gate electrode 118b, a drain electrode 118c, and a semiconductor layer pattern. The source electrode 118a is electrically connected to a source line 118a' and the gate electrode 118b is electrically connected to a gate line 118b'. The drain electrode 118c is electrically connected to the second electrode 112 and the reflective electrode 113 through the contact hole 128. To electrically couple the reflective electrode to the TFT, the contact hole is located in the reflective region 160 and extends through the organic layer that separates the reflective electrode from the TFT.

The reflective region 160 and the transmissive region 150 have different cell gaps. A "cell gap" is the space between the first member 170 and the second member 180 that is occupied by the liquid crystals. Typically, the cell gap in the transmissive region 150 is larger than the cell gap in the reflective region 160 (e.g., the cell gap in the transmissive region is about twice as large as the cell gap in the reflective region). The cell gaps are determined by the thickness of an organic layer formed on the second substrate 120 in the reflective and transmissive regions.

Since the organic layer does not uniformly coat the second substrate, "steps" form where the thickness of the organic layer transitions. For example, steps form at the interface between the transmissive region 150 and the reflective region 160, and at the contact hole 128. The presence of these steps is disadvantageous because the orientation of liquid crystals is difficult to control near these steps. As a result of these steps that are formed, light leakage and afterimage occur. Light leakage occurs mostly in an area of the transmissive region 150 around where rubbing is started, and afterimage occurs near where the rubbing ends. Light leakage occurs independently of the applied voltage while the severity of afterimage depends on the applied voltage. Both light leakage and afterimage deteriorate the display quality of an LCD apparatus.

The contact hole 128 is undesirable not just because it creates a step region but also because it adversely affects the reflectance of the LCD apparatus. Light reflectance in the contact hole 128 is not as high as reflectance in the other parts of the reflective region because of the larger cell gap in the contact hole 128. Thus, it is desirable to eliminate the contact hole 128.

A method of manufacturing an LCD with reduced light leakage and afterimage is desirable.

SUMMARY OF THE INVENTION

The present invention is directed to a liquid crystal display and assembly without a contact hole in the reflective layer. By eliminating the contact hole, the overall reflectance of the apparatus is increased. In order to prevent light leakage and afterimage, the invention includes an interface electrode that is strategically positioned over where light leakage occurs.

In one aspect, the invention is a display apparatus that includes a first substrate, a second substrate, a liquid crystal layer located between the first substrate and the second substrate, and a thin film transistor. The first substrate has a reflective region and a transmissive region including a transparent electrode. The second substrate includes a transparent common electrode. The thin film transistor includes a gate electrode, a source electrode, and a drain electrode, and the gate electrode is located in the reflective region. One of the source electrode and the drain electrode contacts the transparent electrode between the reflective region and the transmissive region.

In another aspect, the invention is a display apparatus including a first substrate, a second substrate, a liquid crystal layer located between the first substrate and the second substrate, and a thin film transistor. The first substrate has a reflective region, a transmissive region including a transparent electrode, and an interface region located between the reflective region and the transmissive region. The second substrate includes a transparent common electrode. The thin film transistor is formed in the reflective region and has a gate electrode that is located in the reflective region. The thin film transistor contacts the transparent electrode in the interface region.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DETAILED DESCRIPTION OF THE EMBODIMENTS

Embodiments of the invention are described herein in the context of reflective-transmissive-type LCD appratuses and more specifically in the context of such apparatuses that have no organic layer in the transmissive region. However, it is to be understood that the embodiments provided herein are exemplary embodiments, and the scope of the invention is not limited to the applications or the embodiments disclosed herein. For example, the invention may be adapted for reflective-type or transmissive-type LCD apparatuses, or reflective-transmissive-type LCD apparatuses having organic layers of different thicknesses. Further, a person of ordinary skill in the art will understand that the invention may be adapted for use with LCD apparatuses operating in various modes, including but not limited to TN mode, VA mode, and IPS mode.

Figure 3:
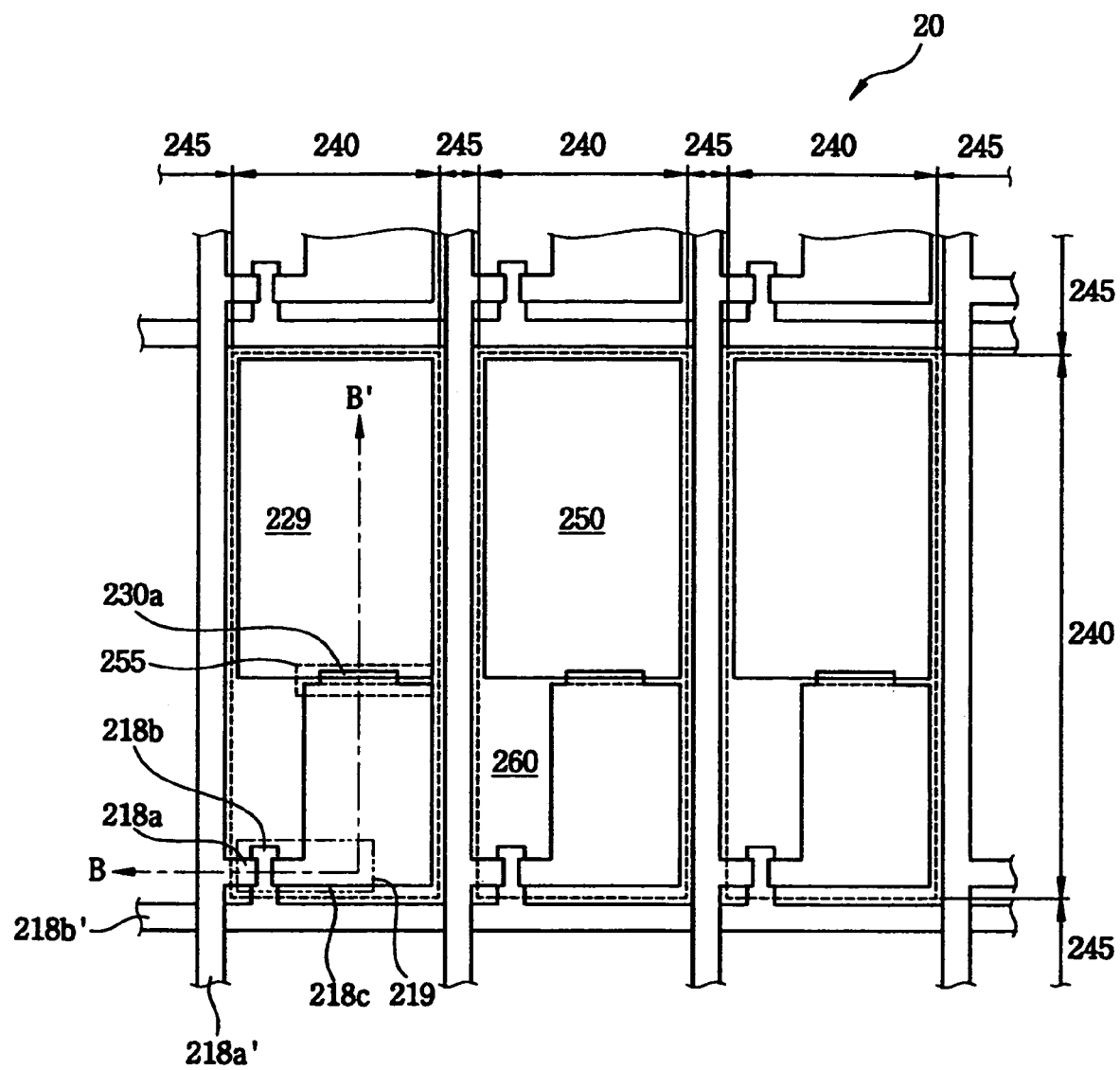
FIG. 3 is a plan view showing an LCD apparatus according to an exemplary embodiment of the present invention.
Figure 4:
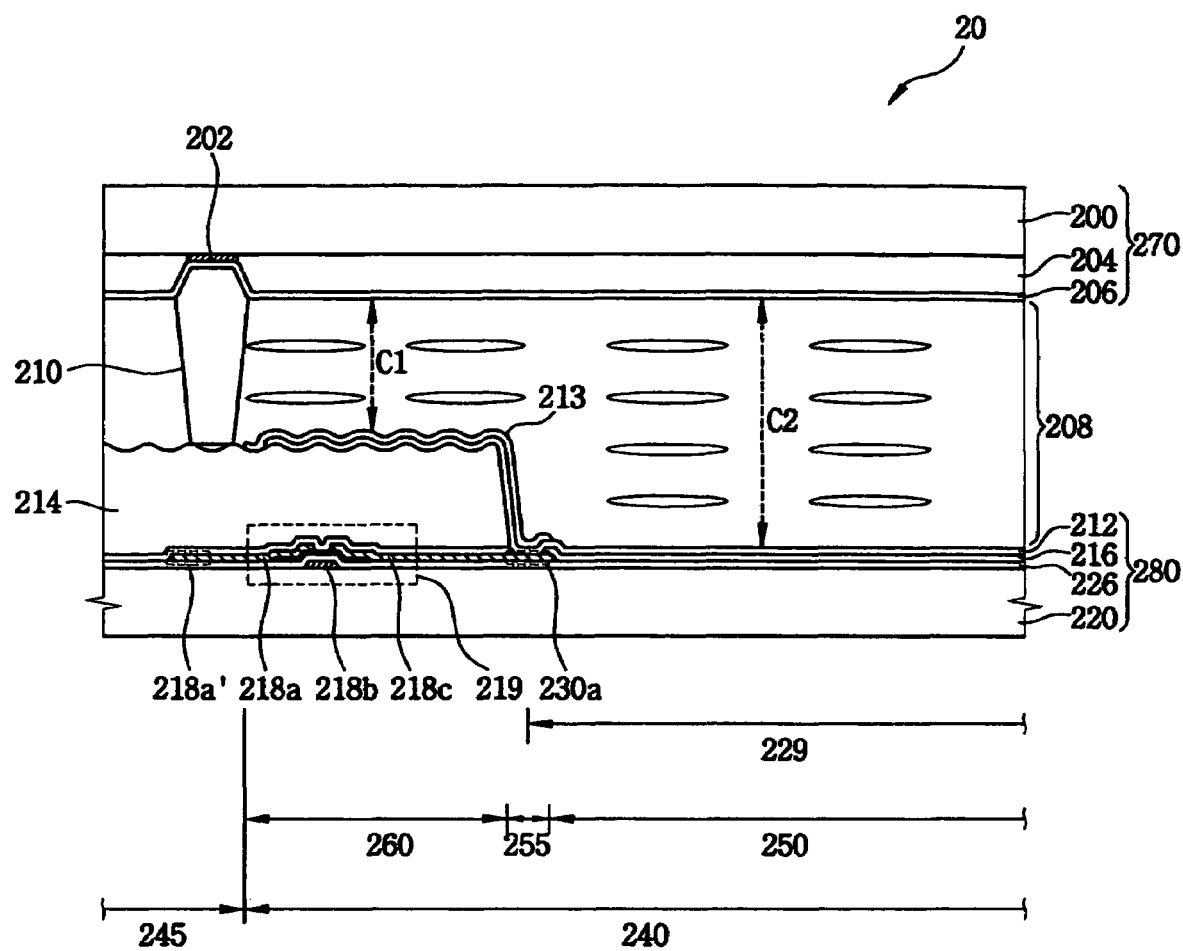
FIG. 4 is a cross-sectional view taken along B-B' line of FIG. 3.

FIG. 3 is a plan view of an LCD apparatus 20 according to a first exemplary embodiment of the present invention, and FIG. 4 is a cross-sectional view taken along the line B-B' of FIG. 3. The LCD apparatus 20 includes a first member 270, a second member 280, and a liquid crystal layer 208. The second member is herein also referred to as "an array substrate." The first member 270 includes a first substrate 200, a black matrix 202, a color filter 204, a first electrode 206, and a spacer 210. The second member 280 includes a second substrate 220, a thin film transistor 219, a gate insulating layer 226, a passivation layer 216, an organic layer 214, a second electrode 212 and a reflective electrode 213. The second member 280 includes a pixel region 240 and a peripheral region 245. The TFT 219, an interface electrode 230a, the second electrode 212, the reflective electrode 213, etc. are disposed in the pixel region 240.

The arrangement of liquid crystals in the liquid crystal layer 208 of the pixel region 240 is controlled to display a desired image. The pixel region 240 includes a transmissive region 250, a reflective region 260, and an interface region 255 located between the transmissive region 250 and the reflective region 260. Unlike the liquid crystals in the pixel region 240, the arrangement of liquid crystals in the peripheral region 245 cannot be controlled and hardly any light passes through the peripheral region 245. The source line 218a', the gate line 218b', the driving integrated circuit (not shown), etc. are disposed in the peripheral region 245.

Light generated from a backlight assembly (not shown) passes through the transmissive region 250. Light from a source that is external to the LCD apparatus is reflected in the reflective region 260. The transmissive region 250 may have a rectangular shape, a trapezoidal shape, a triangular shape, a circular shape, etc. A transmissive-type LCD apparatus, unlike a reflective-transmissive-type LCD apparatus, does not have the reflective region 260.

The first and second substrates 200 and 220 include transparent glass layers through which light passes. The glass layers do not include alkaline ions. When the glass layer includes alkaline ions, the alkaline ions dissolved in the liquid crystals, lowering the resistivity of the liquid crystals. The lowered resistivity of the liquid crystals affects the display and decreases the adhesiveness between the sealant and the glass.

The black matrix 202 is disposed in the peripheral region 245 of the first substrate 200, thereby blocking light. The black matrix 202 blocks the light that passes through the peripheral region 245 and increases the display quality of the LCD apparatus. The black matrix 202 is formed by depositing an opaque material on the first substrate 200 and partially removing the deposited opaque material. The remaining opaque material forms the black matrix 202.

The color filter 204 is formed on the first substrate 200 having the black matrix 202 disposed thereon. Light having a predetermined wavelength passes through the color filter. In an alternative embodiment, the color filter 204 may be a part of the second substrate 220 instead of the first substrate 200.

The first electrode 206 is disposed over the first substrate 200 having the black matrix 202 and the color filter 204. The first electrode usually includes a transparent conductive material such as indium tin oxide (ITO), indium zinc oxide (IZO), zinc oxide (ZO), etc. Alternatively, the first electrode 206 may be disposed on the second substrate 220 parallel to the second electrode 212 and the reflective electrode 213.

The spacer 210 is disposed on the first substrate 200 including the black matrix 202, the color filter 204, and the first electrode 206. The first member 270 is spaced apart from the second member 280 by a predetermined cell gap using the spacer 210. Preferably, the spacer 210 is aligned with the black matrix 202. The spacer 210 may be a column spacer, a ball spacer or a hybrid design. In an alternative embodiment, the spacer 210 is disposed aligned with the TFT 219 instead of the black matrix 202.

The TFT 219 is disposed in the reflective region 260 of the second substrate 220, and includes a source electrode 218a, a gate electrode 218b, a drain electrode 218c, a semiconductor layer pattern, and an interface electrode 230a. A driving integrated circuit (not shown) applies a data voltage to the source electrode 218a through the source line 218a', and the driving integrated circuit (not shown) applies a selecting signal to the gate electrode 218b through the gate line 218b'.

Figure 1:
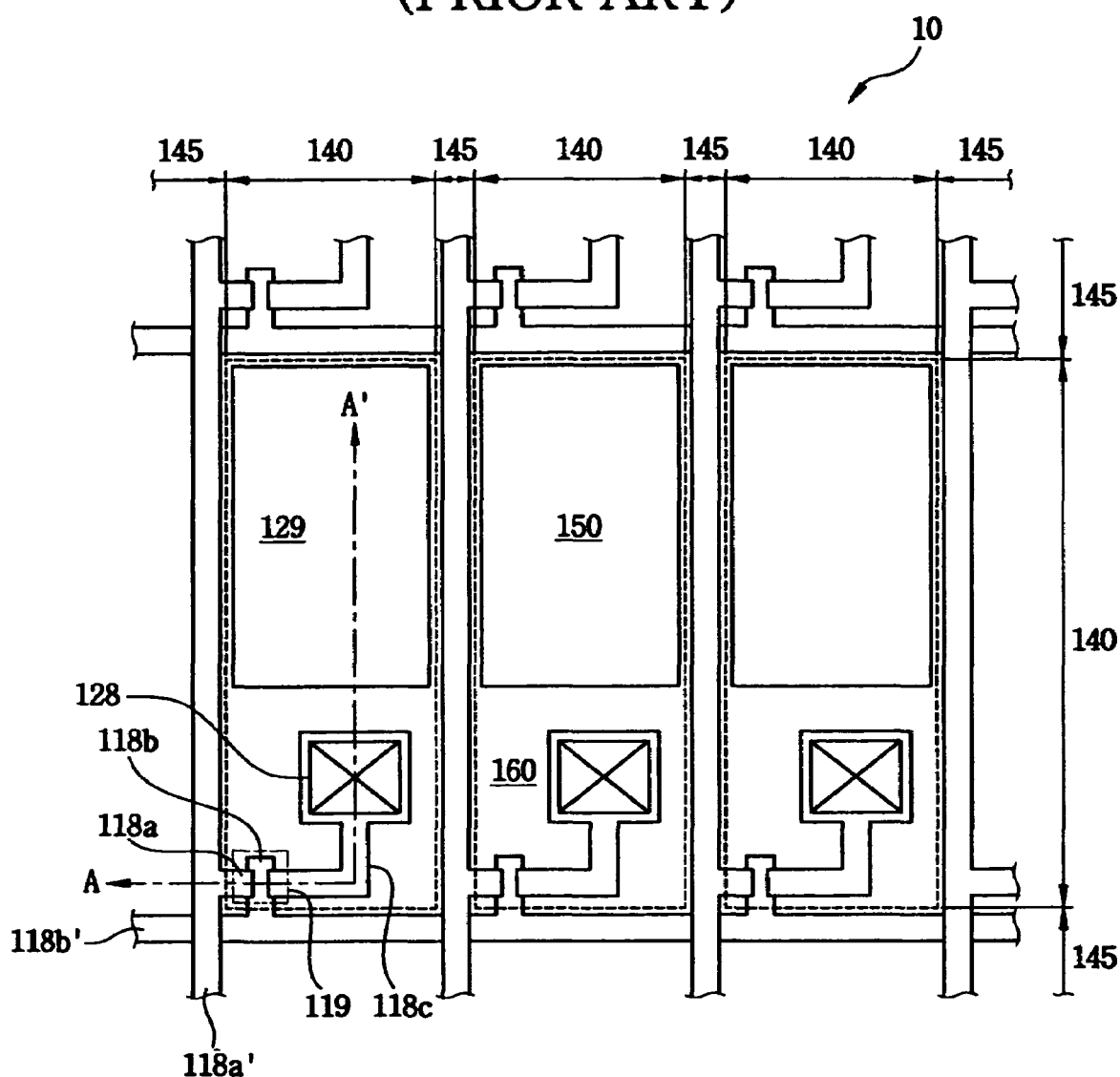
FIG. 1 is a plan view showing a conventional LCD apparatus including a contact hole.
Figure 2:
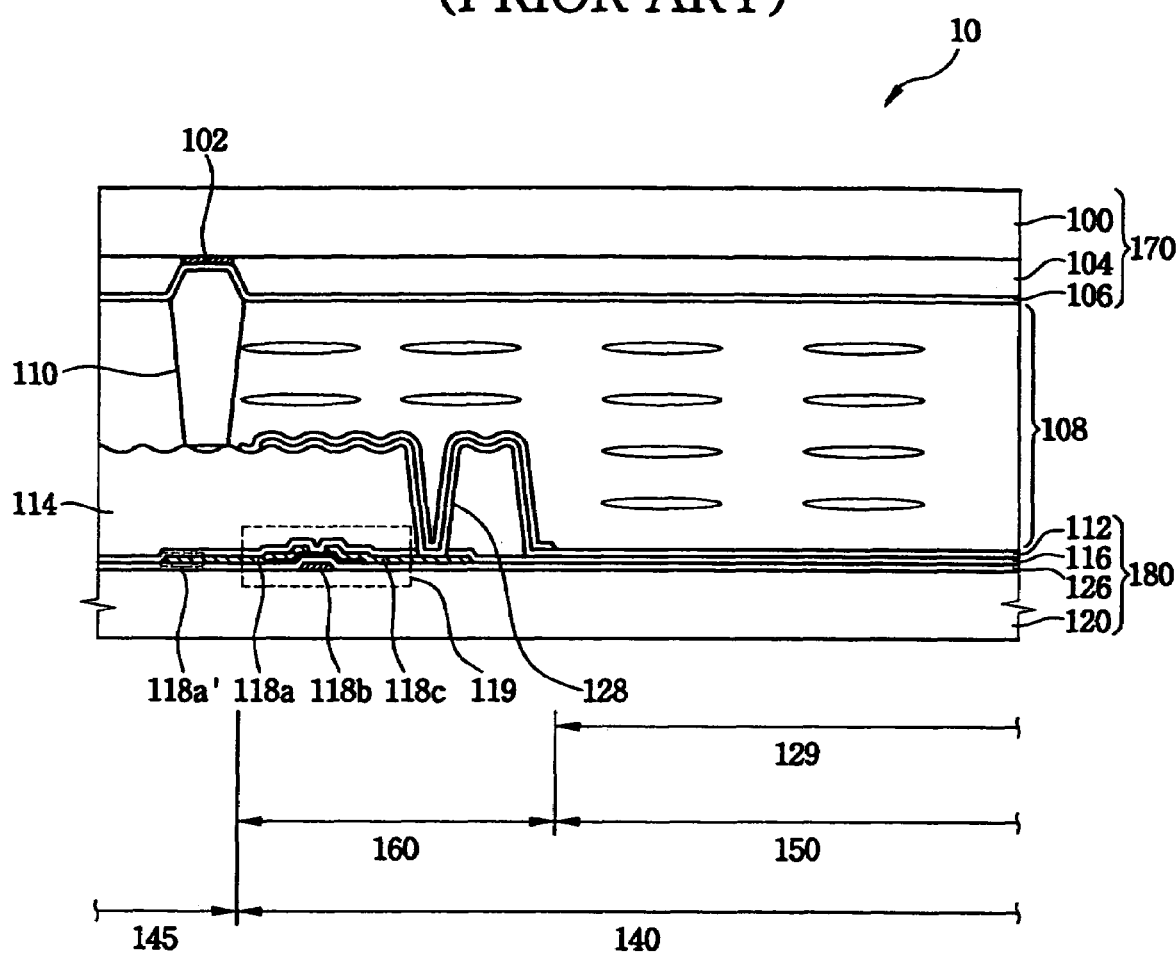
FIG. 2 is a cross-sectional view taken along A-A' line of FIG. 1.

The interface electrode 230a is electrically connected to the drain electrode 218c, and electrically couples the drain electrode 218c to the second electrode 212. The semiconductor layer pattern is disposed on a portion of the gate insulating layer. When the gate selecting signal is applied to the gate electrode 218b, a current flows between the source electrode 218a and the drain electrode 218c through a channel formed in the semiconductor layer. The interface electrode 230a is disposed in the interface region 255, adjacent to the drain electrode 218c. In the embodiment shown, the interface electrode 230a has a rectangular shape extending in a direction parallel to the direction in which the gate line 218b' extends. The interface electrode 230a, which is located in the interface region 255, may be smaller than the contact hole 128 in the conventional LCD apparatus 10 (see FIGS. 1 and 2). When the width of the interface electrode 230a is decreased, the surface area of the reflective region 250 increases, raising the overall luminance of the LCD apparatus. Where the interface electrode 230a is larger than the contact hole 128, the interface electrode 230a is usually made of an opaque material for blocking light. By blocking the light that passes through the interface region 255, the opaque material prevents light leakage and afterimage.

A storage capacitor (not shown) is formed on the second substrate 220 so as to maintain a voltage difference between the first electrode 206 and the reflective electrode 213 or between the first electrode 206 and the second electrode 212. The storage capacitor (not shown) may be an end gate type or an isolated line type.

The gate insulating layer 226 is formed over the second substrate 220 having the gate electrode 218b so as to electrically insulate the gate electrode 218b from the source and drain electrodes 218a and 218c. A portion of the gate insulating layer 226 in the transmissive region 250 may be omitted so as to increase the transmittance. The gate insulating layer 226 comprises silicon nitride (SiNx).

The passivation layer 216 is formed over the second substrate having the TFT 219 in a way that it does not entirely cover the interface electrode 230a. There may be a discontinuous section of the passivation layer 216 in the transmissive region 250 for increased transmittance. The passivation layer 226 contains silicon nitride (SiNx).

The organic layer 214 includes an opening 229 that forms the transmissive region 250 and the interface region 255. The organic layer 214 is disposed on the second substrate 220 having the TFT 219 and the passivation layer 226 so as to electrically insulate the TFT 219 from the second electrode 212 and the reflective electrode 213. The presence of the opening 229 in the organic layer 214 causes the liquid crystal layer 208 to have two different thicknesses in the reflective region 260 and the transmissive region 250, and a sidewall in the interface region. More specifically, the reflective region 260 has a first cell gap (C1) and the transmissive region 250 has a second cell gap (C2) that is different from the first cell gap. The "cell gap," as used herein, refers to the thickness of the liquid crystal layer 208 between the first member 270 and the second member 280. The organic layer 214 forms a somewhat planar surface by coating the bumpy surfaces formed by the source line 218a', the gate line 218b', etc. In an alternative embodiment, a thin film of the organic layer 214 remains in the opening 229 but does not cover the interface electrode 230a.

Optionally, the organic layer 214 is patterned to include a plurality of recesses and protrusions, or dips and bumps. It is well known that the pattern on the reflective surface increase reflectance of the reflective electrode 213 by reflecting light in a desired direction. When the organic layer 214 is patterned, the cell gap is calculated using the average height of the pattern.

The second electrode 212 that is electrically connected to the interface electrode 230a is formed in the transparent region 250 and on the passivation layer 216. The second electrode 212 also covers the interface electrode 230a. A voltage is applied between the second electrode 212 and the first electrode 206 to manipulate the arrangement of the liquid crystals in the liquid crystal layer 208, thereby controlling light transmission. The second electrode 212 comprises a transparent conductive material such as indium tin oxide (ITO), indium zinc oxide (IZO), zinc oxide (ZO), etc. Alternatively, a portion of the second electrode 212 is disposed on a portion of the organic layer 214 in the reflective region 260.

The reflective electrode 213 is disposed on the organic layer 214 and a portion of the second electrode 212 near the interface electrode 230a to reflect light coming from an external source. Preferably, the reflective electrode 213 is disposed on the patterned organic layer 214 having the recesses and protrusions, such that it reflects light in a predetermined direction. The reflective electrode 213 is electrically connected to the drain electrode 218c through the second electrode 212 and the interface electrode 230a.

A driving integrated circuit (not shown) applies data voltage to the second electrode 212 and the reflective electrode 213 through the TFT 219 and the interface electrode 230a to form an electric field between the first electrode 206 and the second electrode 212, and an electric field between the first electrode 206 and the reflective electrode 213. The second electrode 212 may be disposed over the pixel region 240, and the reflective electrode 213 may be disposed on a portion of the second electrode 212 corresponding to the reflective region 260.

In some embodiments, the positions of the reflective electrode 213 and the second electrode 212 may be switched.

The liquid crystal layer 208 is disposed between the first and second members 270 and 280 and sealed with a sealant (not shown). The liquid crystal layer 208 may be in any of the well-known modes including a vertical alignment (VA) mode, a twisted nematic (TN) mode, a mixed twisted nematic (MTN) mode or a homogeneous alignment mode. The homogeneous alignment mode includes an electrically controlled birefringence (ECB) mode.

It is well-known to use alignment films with liquid crystal devices to align the liquid crystals in the liquid crystal layer 208. Alignment films (not shown) are disposed on the first and second members 270 and 280. The surfaces of the alignment films (not shown) are rubbed in a "rubbing direction," which is also the direction in which the liquid crystals become aligned. Preferably, the rubbing direction is parallel to the direction in which the source line 218a' extends. The interface region 255 is difficult to rub properly because of the "step" at the interface formed by the organic layer 214. As a result, the problems of light leakage and afterimage often stem from the inadequate alignment near this interface region. The exact location where light leakage and afterimage occurs is dependent on the rubbing direction. Forming the interface electrode 230a in the region that is primarily responsible for the problems of light leakage and formation of afterimage solves these problems by blocking light. Preferably, the interface electrode 230a is positioned and shaped to achieve the most dramatic reduction in light leakage and afterimage, although the invention is not so limited. Likewise, the invention is not limited to any particular rubbing direction.

FIGS. 5A, 5B, 5C, and 5D are plan views depicting a method of manufacturing the LCD apparatus 20, and FIGS. 6A through 6J are cross-sectional views showing the manufacturing method.

Figure 5A:
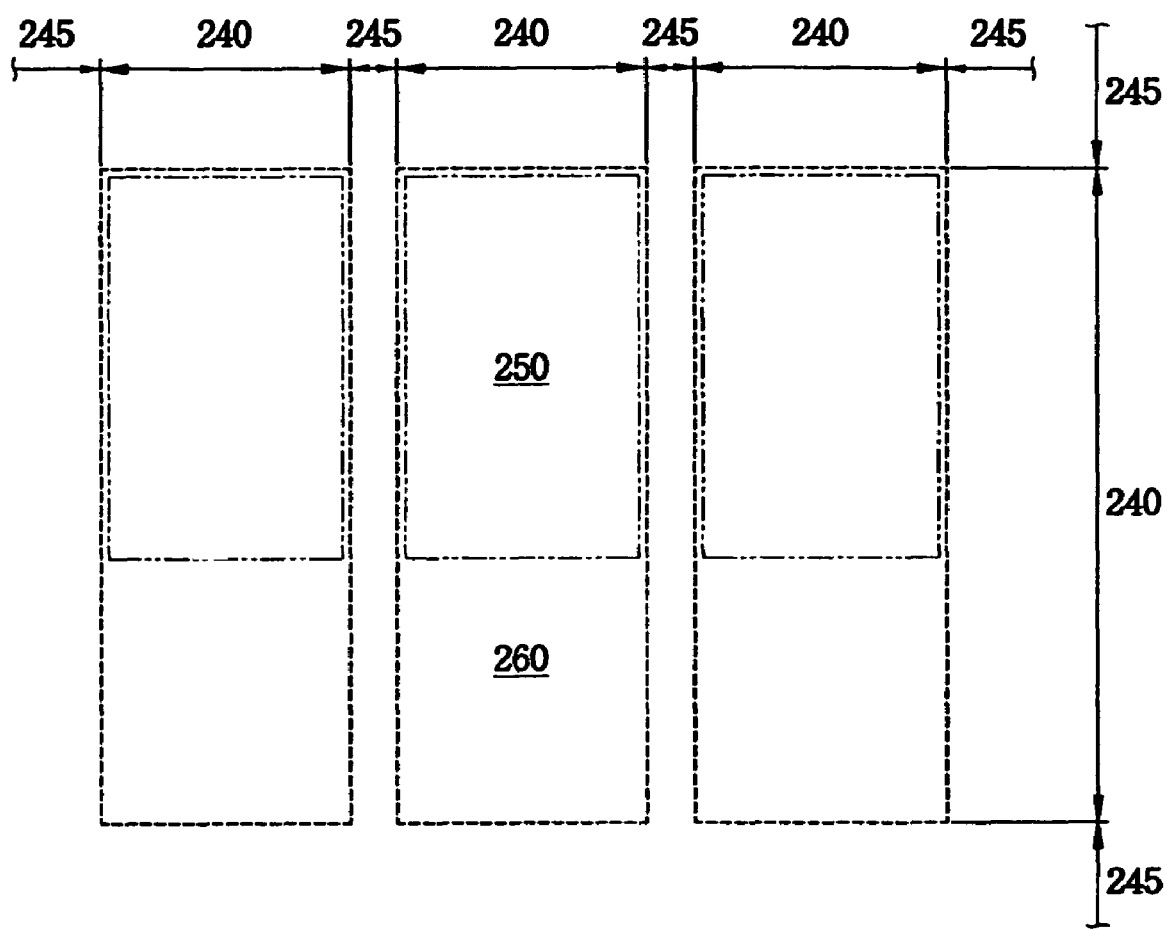
FIGS. 5A to 5D are plan views showing a method of manufacturing an LCD apparatus according to an exemplary embodiment of the present invention.
Figure 6A:
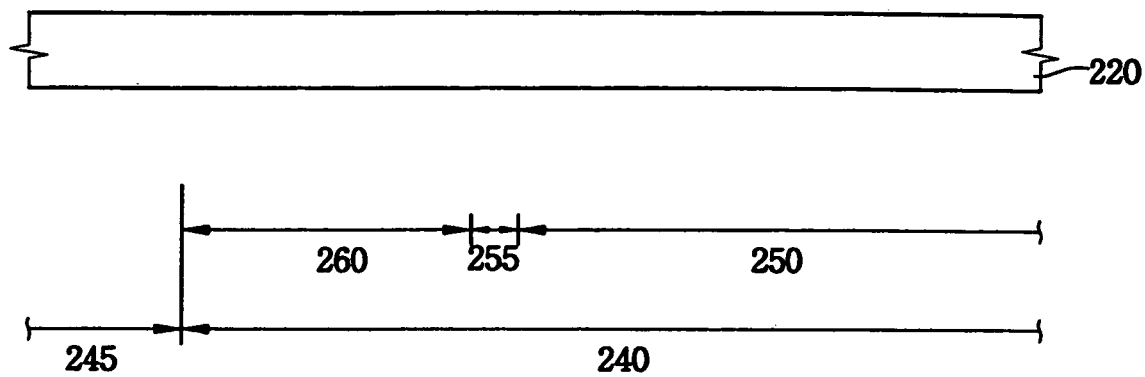
FIGS. 6A to 6J are cross-sectional views showing a method of manufacturing an LCD apparatus according to an exemplary embodiment of the present invention.

Referring to FIGS. 5A and 6A, the pixel region 240 and the reflective region 260 are defined on the second substrate 220. The pixel region 240 includes the transmissive region 250 that transmits the light from the backlight assembly (not shown). The reflective region 260 reflects the light from an external source.

Figure 5B:
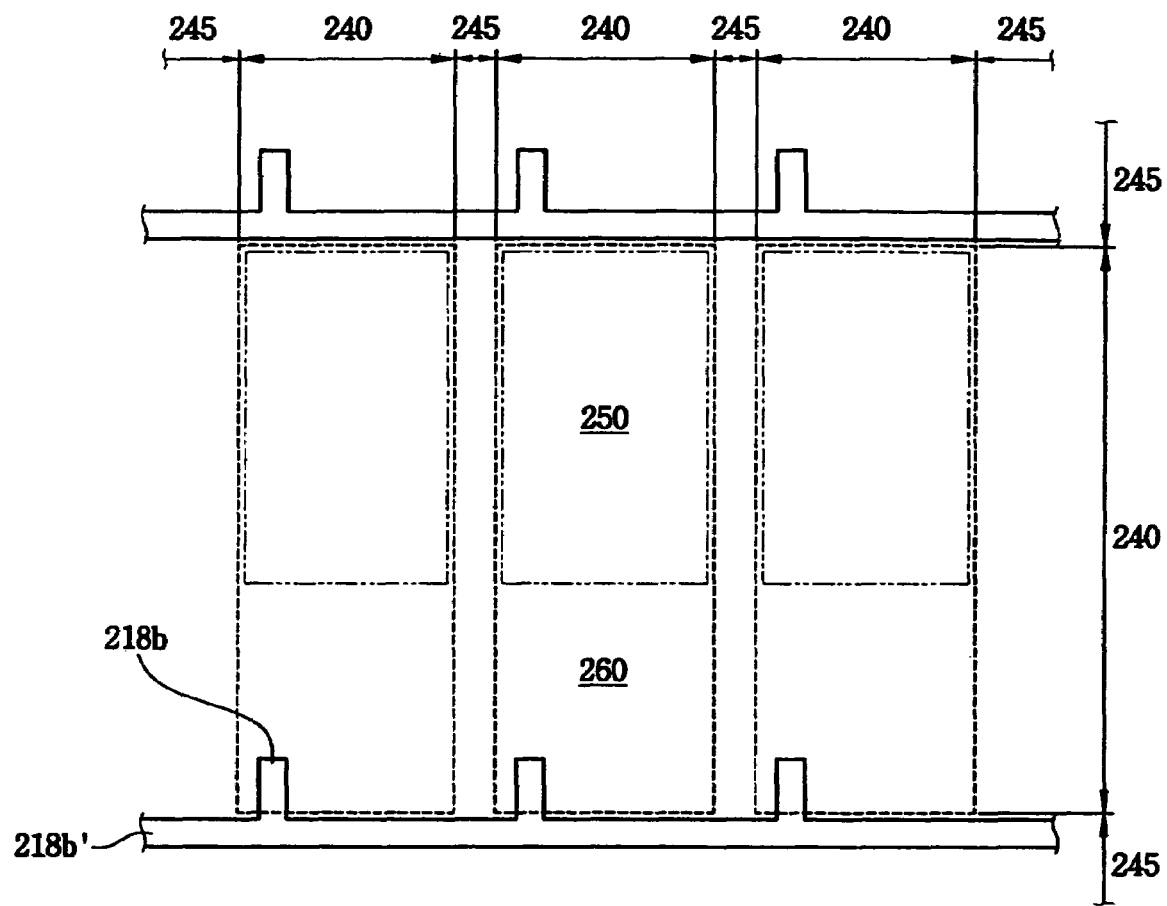
Figure 6B:
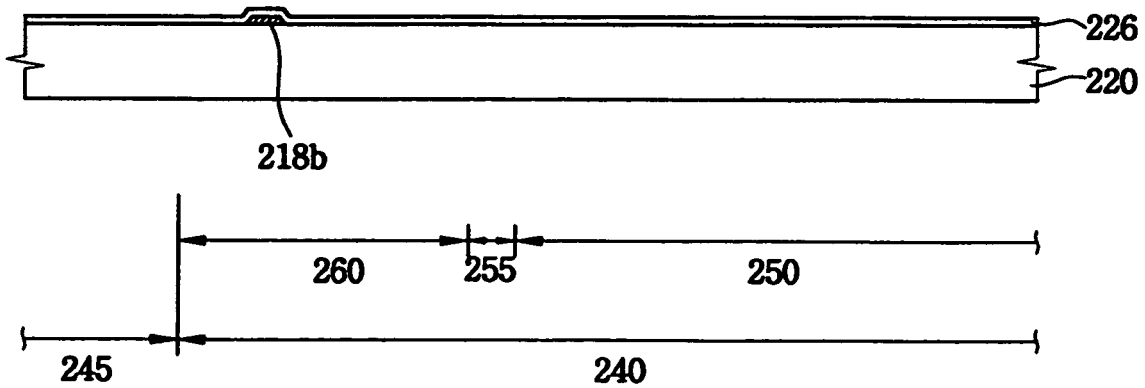

Referring to FIGS. 5B and 6B, a conductive material is deposited on the second substrate 220. The deposited conductive material is partially removed to form the gate electrode 218b and the gate line 218b'. The gate insulating layer 226 is deposited over the second substrate 220 having the gate electrode 218b and the gate line 218b '. The gate insulating layer 226 includes silicon nitride (SiNx).

Figure 5C:
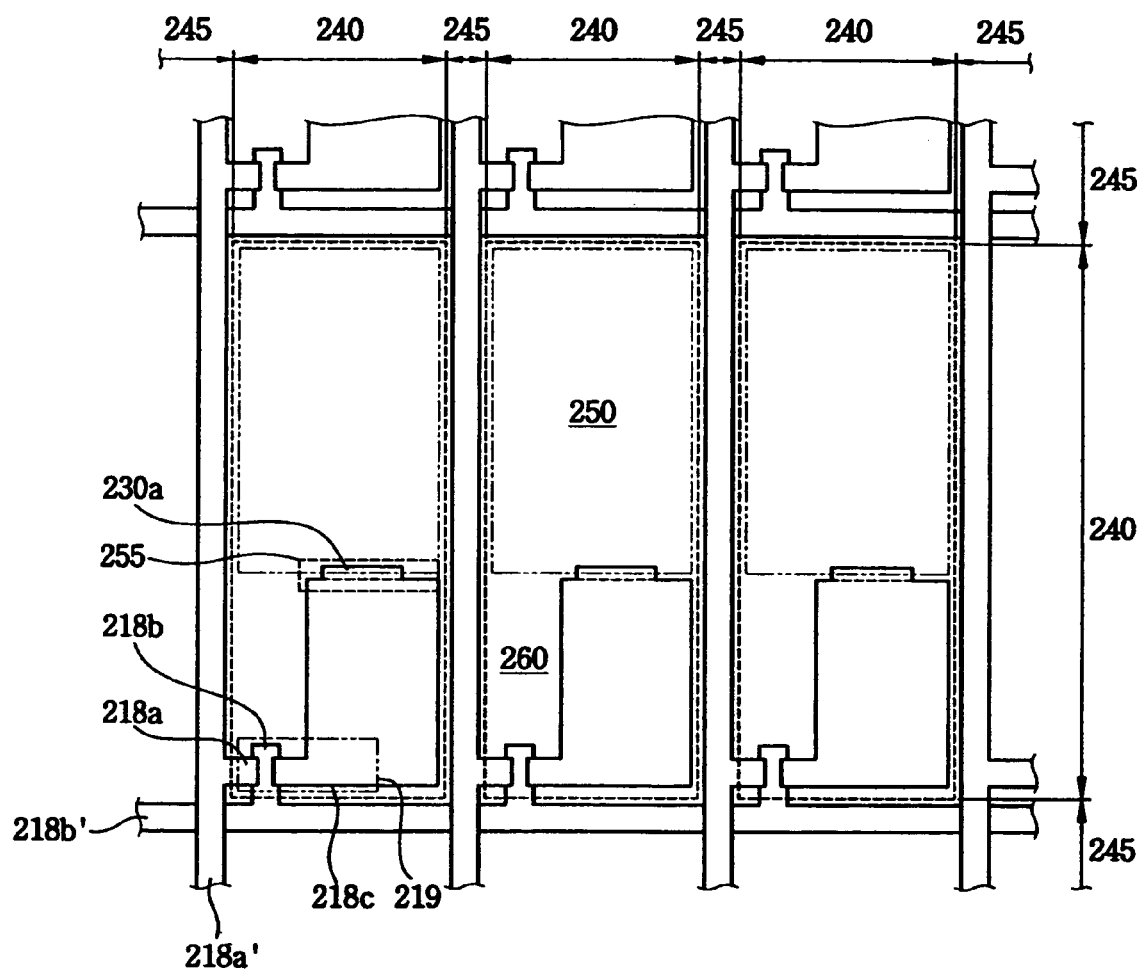
Figure 5D:
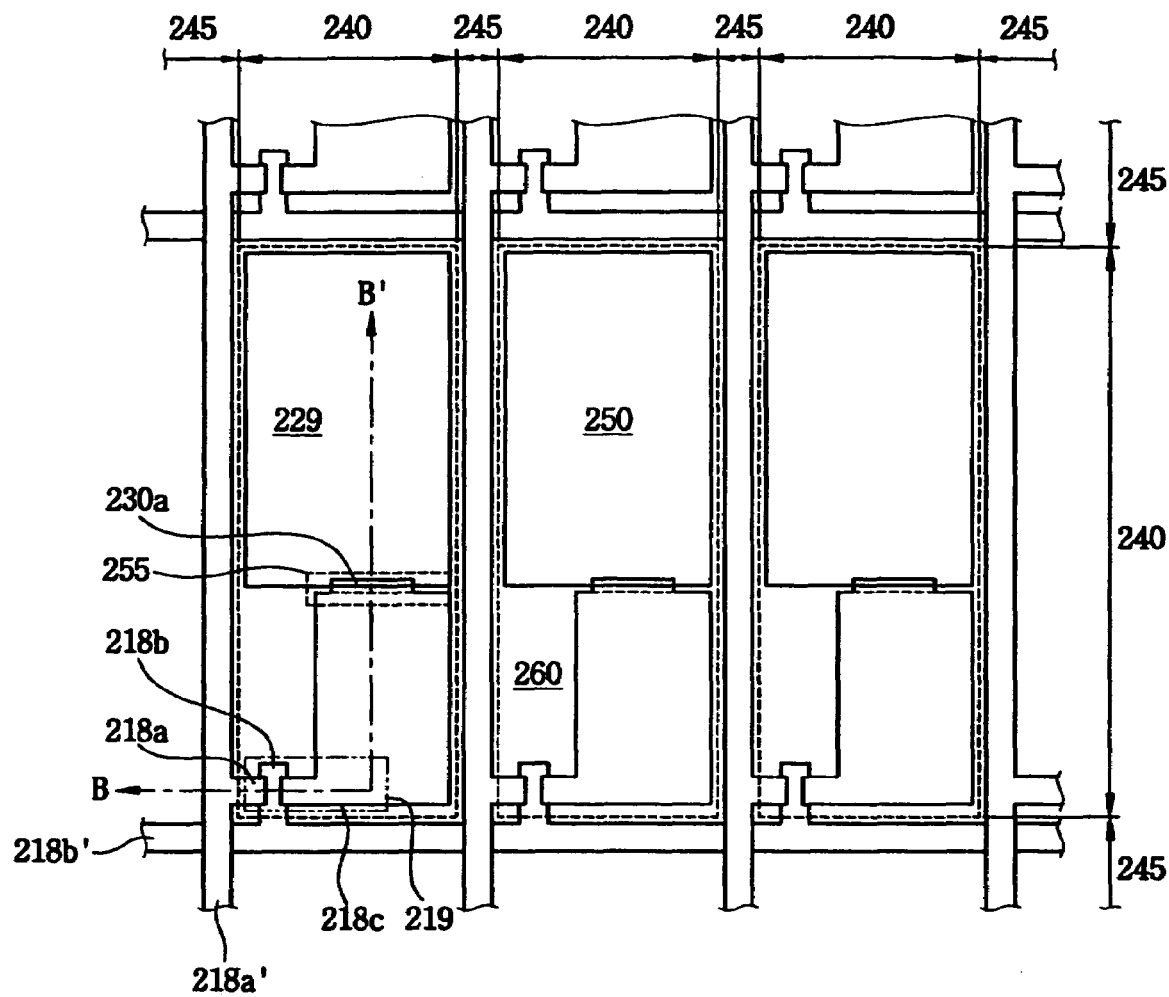
Figure 6C:
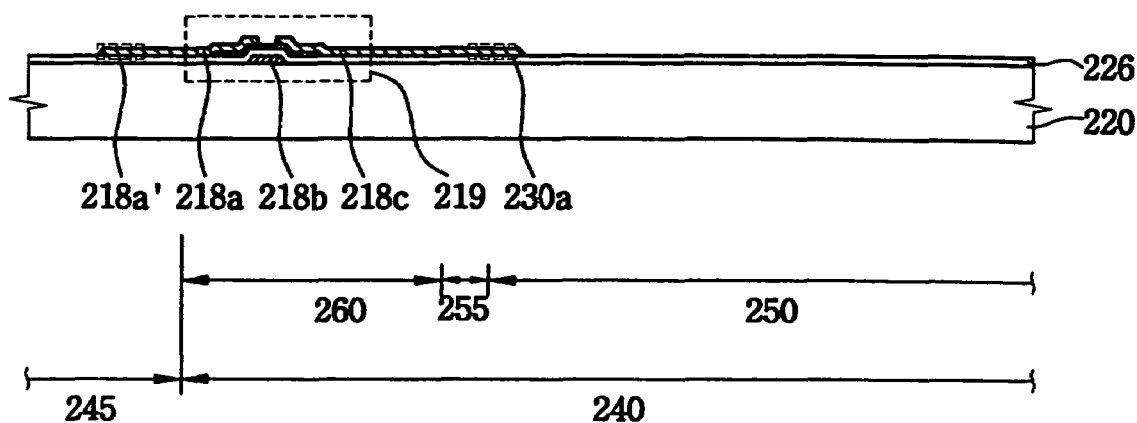

Referring to FIGS. 5C and 6C, amorphous silicon and N+ amorphous silicon are consecutively deposited on the second substrate having the gate insulating layer 226. The deposited amorphous silicon and N+ amorphous silicon layers are etched to form the semiconductor layer on the gate insulating layer 226 corresponding to the gate electrode 218b. A conductive material is deposited on the gate insulating layer 226 having the semiconductor layer. The deposited conductive material is partially etched to form the source electrode 218a, the source line 218a', the drain electrode 218c and the interface electrode 230a. Therefore, the TFT 219 having the source electrode 218a, the gate electrode 218b, the drain electrode 218c and the semiconductor layer is formed.

The interface electrode 230a is disposed in the interface region 255 such that it contacts the drain electrode 218c. The interface electrode 230a has a rectangular shape and extends in the same direction as the gate line 218b'.

The interface electrode 230a may be formed together with the drain electrode 218c, as an integrated electrode. Alternatively, the interface electrode 230a may be formed by a process that is separate from the process for forming of the drain electrode 218c.

Figure 6D:
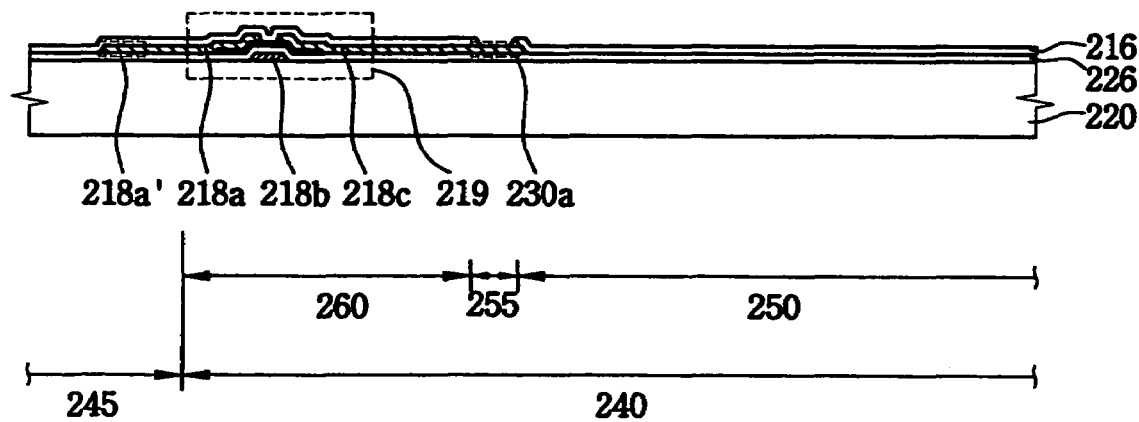

Referring to FIG. 6D, a transparent insulating material is deposited on the second substrate 220 having the TFT 219, to form the passivation layer 216. Preferably, the transparent insulating material comprises silicon nitride ($SiN_x$). The passivation layer 216 near the interface electrode 230a is removed to expose a part of the interface electrode 230a. Thus, the passivation layer 216 does not cover the interface electrode 230a in its entirety. The opening may be formed before or after the organic layer 214 is formed.

Figure 6E:
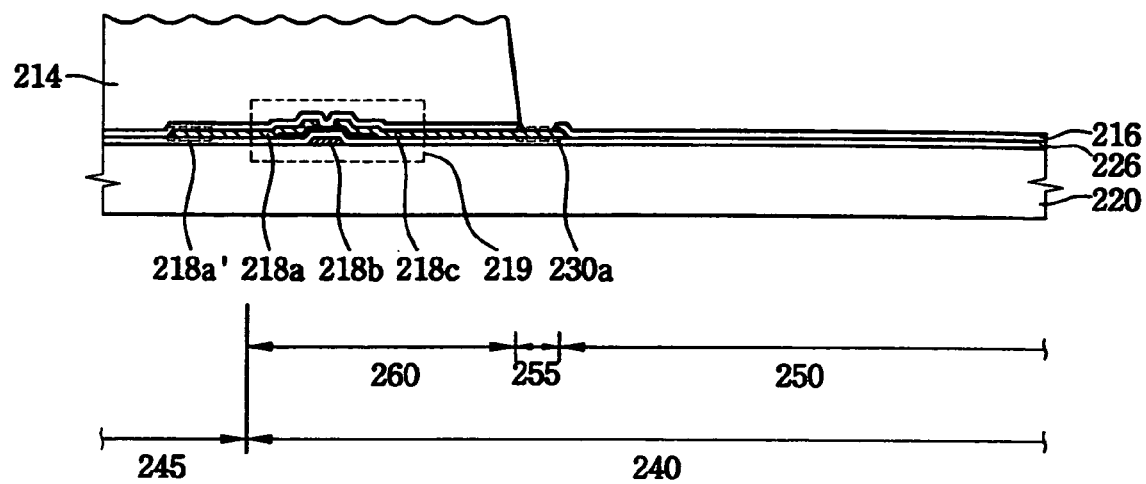

Referring to FIG. 6E, an organic material (e.g., photoresist) is deposited on the passivation layer 216 and developed to form the patterned organic layer 214 with the opening 229 in the transmissive region 250. The interface electrode 230a and the passivation layer 216 in the transmissive region 250 are exposed through the opening 229. "Patterned," as used herein, refers to an uneven surface, e.g., a surface having dips (recesses) and bumps (protrusions). The recesses and protrusions are disposed on the organic layer 214. The exposing process may be performed using one mask or a plurality of masks. When one mask is used, the mask includes slits or translucent portions. The slits or translucent portions of the mask form the patterns on the surface of the organic layer, and the transparent portion of the mask forms the interface electrode 230a and the transmissive region 250.

The first and second cell gaps are controlled by the thickness of the organic layer 214. Typically, the thickness of the organic layer 214 is approximately equal to a half of the second cell gap minus the thickness of the reflective electrode 213.

Figure 6F:
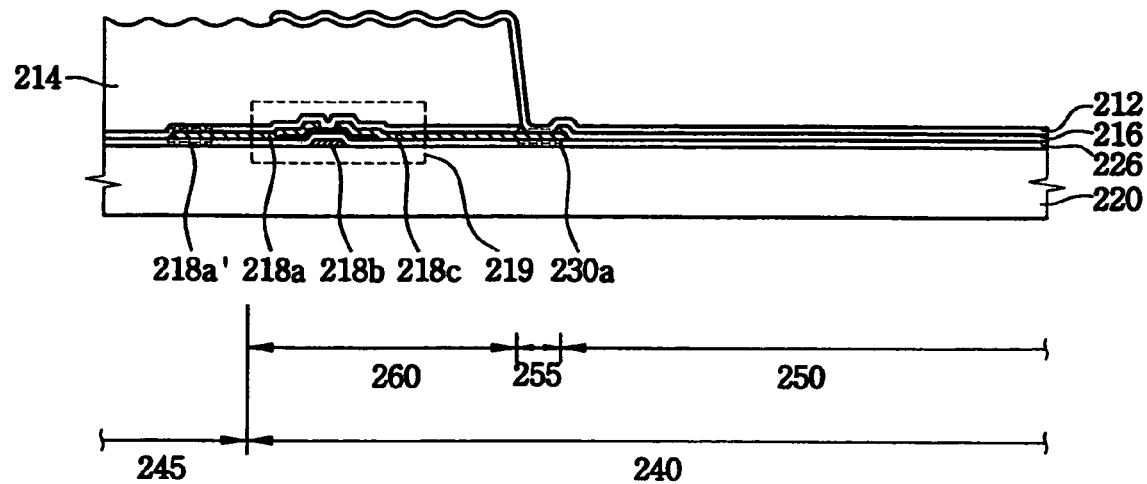

Referring to FIG. 6F, a transparent conductive material is deposited on the organic layer 214 and the passivation layer 216. The transparent conductive material may include ITO, IZO, ZO, etc. The deposited transparent conductive material is partially etched to form the second electrode 212. The second electrode 212 is formed on the transmissive region 250 and the interface electrode 230a. The second electrode 212 is also disposed on the organic layer 214, as shown.

Figure 6G:
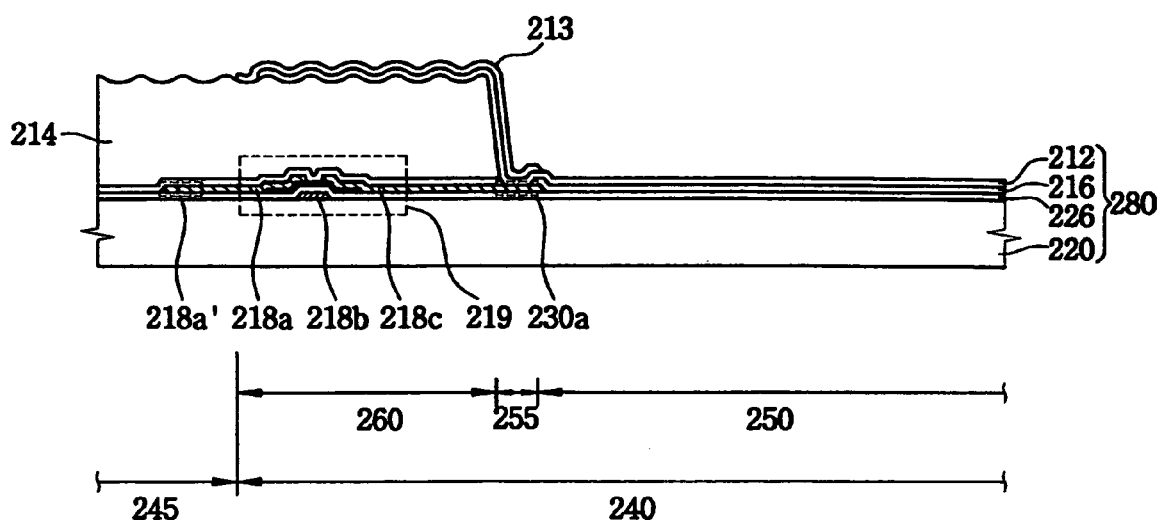

Referring to FIG. 6G, a conductive material having high reflectance is deposited on the organic layer 214 and the second electrode 212. Preferably, the conductive material having high reflectance comprises aluminum (Al) and neodymium (Nd). The deposited conductive material having high reflectance is partially etched to form the reflective electrode 213 in the reflective region 260.

The reflective electrode 213 may have a multi-layered structure. The multi-layered structure may include one or more of a molybdenum-tungsten (Mo—W) alloy layer, a silver layer, a silver alloy layer, and an aluminum-neodymium (Al—Nd) alloy layer. The reflective electrode 213 is electrically connected to the drain electrode 218*c* through the second electrode 212 and the interface electrode 230*a*.

In some embodiments, the second electrode 212 is formed after the reflective electrode 213 is formed so that a part of the second electrode 212 is disposed on the reflective electrode 213 (e.g., see FIG. 4). When the second electrode 212 is disposed on the reflective electrode 213, the adhesiveness of the reflective electrode 213 is increased.

Figure 6H:
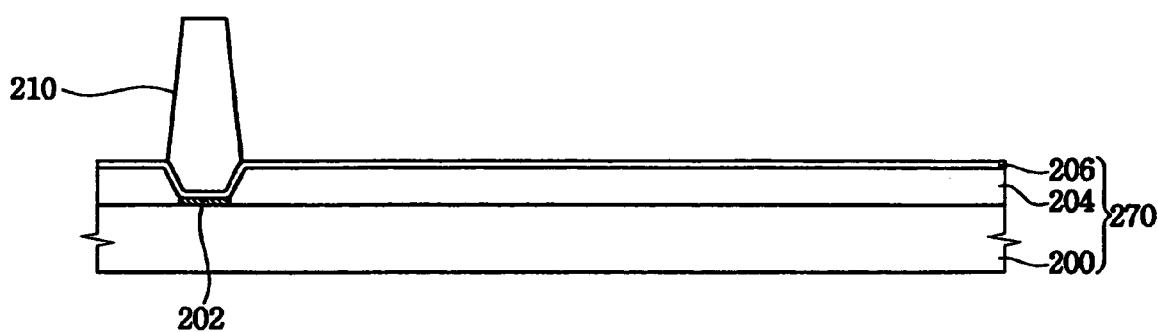

Referring to FIG. 6H, an opaque material is deposited on the first substrate 200. The opaque material is removed from the pixel region 140 (shown in FIG. 2) to form the black matrix 202 in the peripheral region 145 (also shown in FIG. 2).

The color filter 204 is formed on the first substrate 200 having the black matrix 202. As described above, light having a predetermined wavelength passes through the color filter 204. In an alternative embodiment, the color filter 204 may be formed on the second substrate 220 instead of the first substrate 200. When the color filter 204 is formed on the second substrate 220, the color filter may be positioned between the organic layer 214 and the second substrate 220.

A transparent conductive material is deposited on the first substrate 200 having the color filter 204 and the black matrix 202 to form the first electrode 206. The transparent conductive material typically includes one of ITO, IZO, ZO, etc.

An organic material is coated on the first electrode 206. Preferably, the organic material comprises photoresist. The coated organic material is then exposed and developed to form the spacer 210 on the portion of the first electrode 206 that overlies the black matrix 202. The spacer 210 is not limited to being a column spacer, as shown, and may be replaced with ball spacers or any other spacer shape/configuration.

Figure 6I:
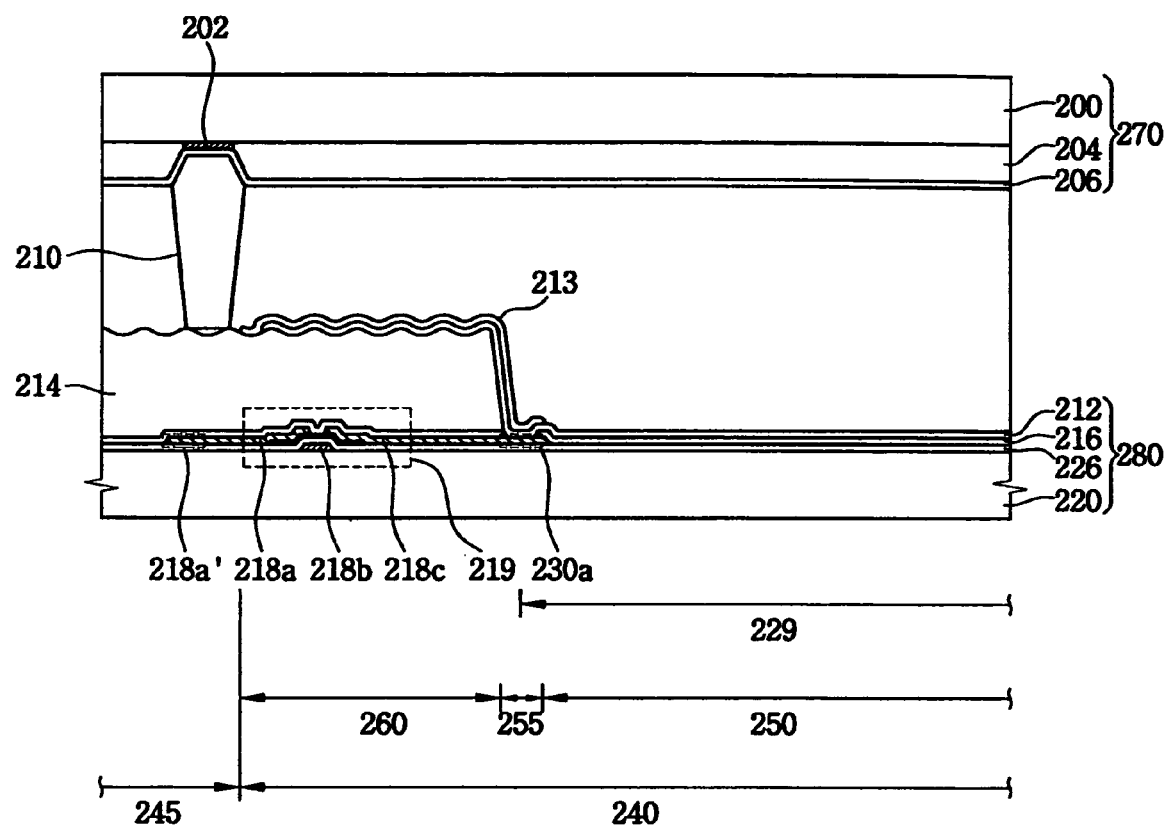
Figure 6J:
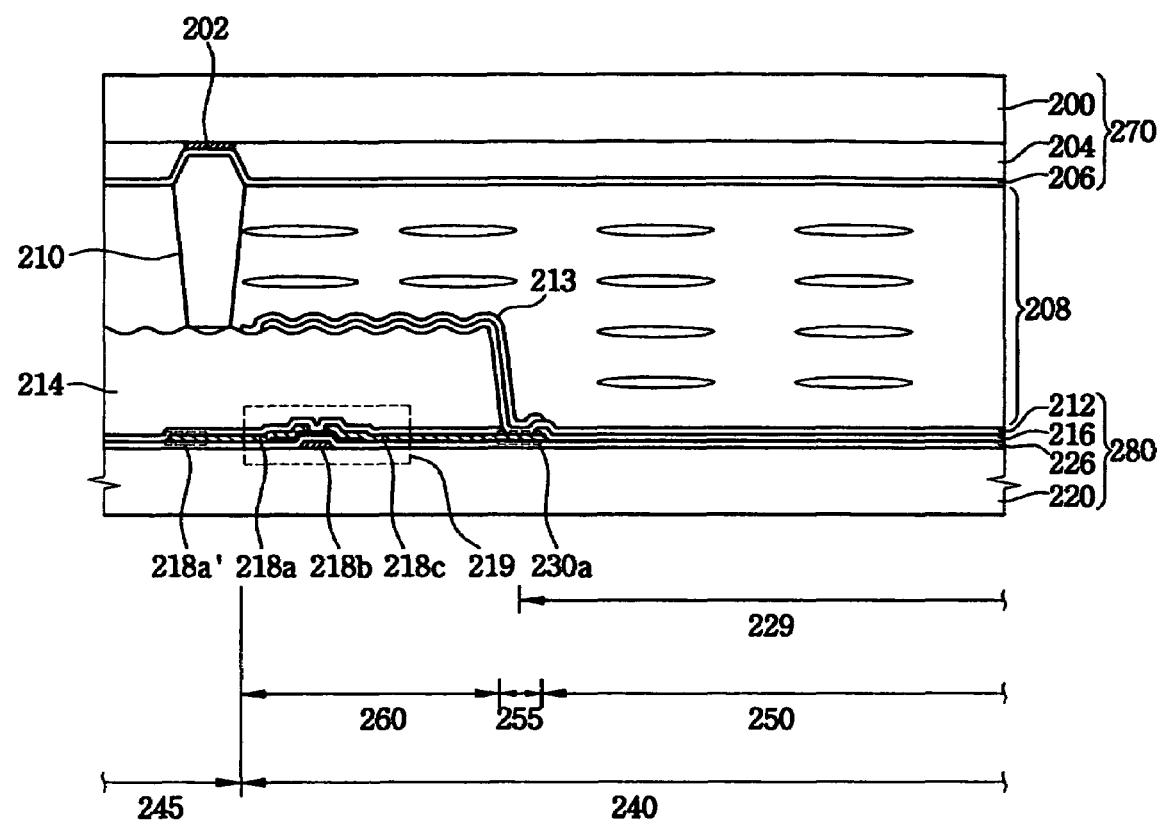

Referring to FIG. 6I, the first member 270 is combined with the second member 280. Referring to FIG. 6J, liquid crystals are injected into the space between the first and second members 270 and 280 and sealed by the sealant (not shown). Alternatively, the liquid crystals are dropped on the first member 270 or the second member 280 having the sealant (not shown) and then the two members are combined to form the liquid crystal layer 208.

When the alignment layer (not shown) is rubbed in a direction that is substantially parallel to the direction in which the source line 218*a*' extends, the LCD apparatus benefits from the presence of the interface electrode 230*a*. As described above, the interface electrode 230*a* usually has a rectangular shape and extends in the direction parallel to the gate line 218*b*'. By blocking light at the interface between the reflective and the transmissive regions, the interface electrode 230*a* decreases light leakage and afterimage, enhancing the overall display quality of the LCD apparatus.

Figure 7:
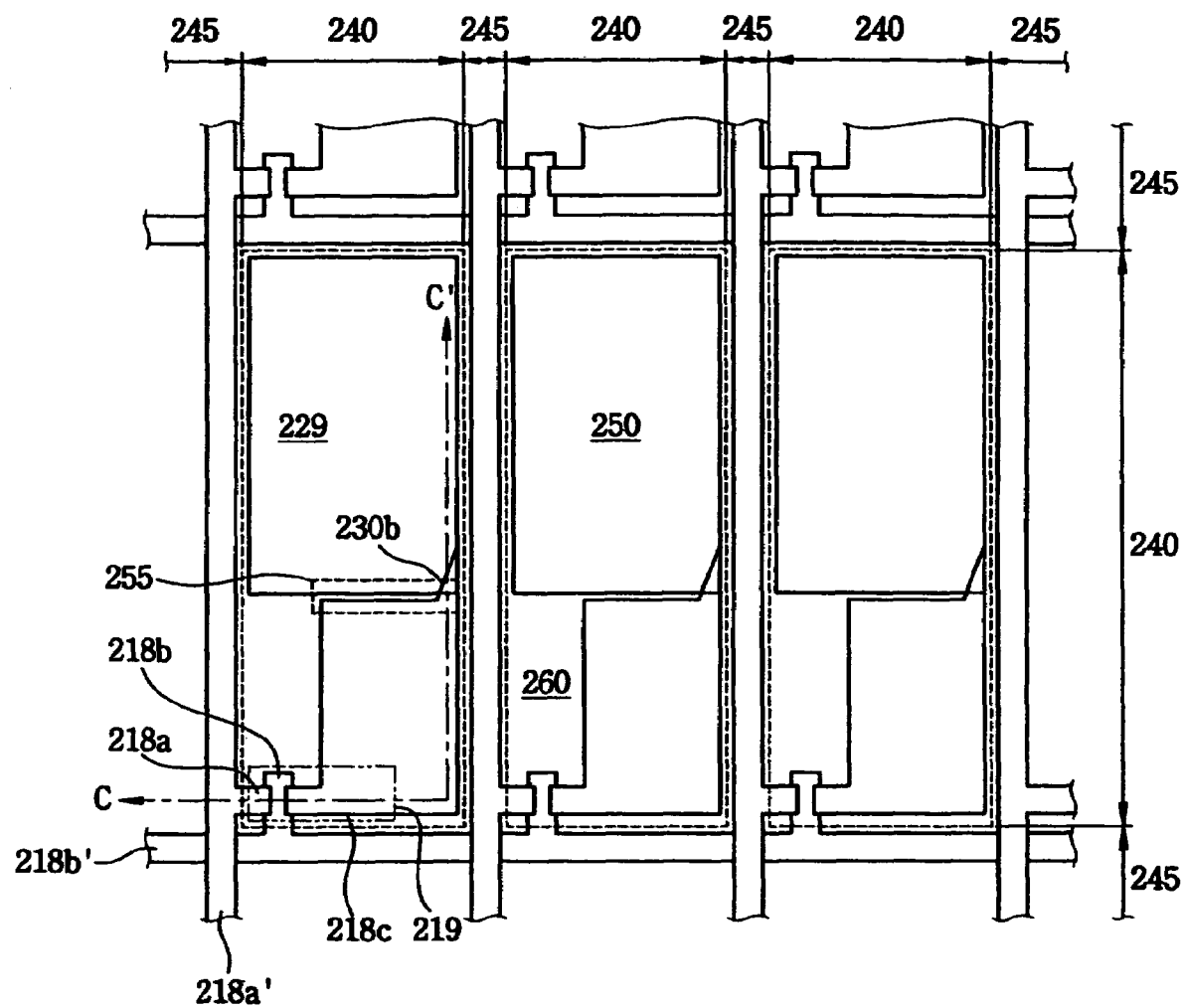
FIG. 7 is a plan view showing an LCD apparatus according to another exemplary embodiment of the present invention.

FIG. 7 is a plan view showing an LCD apparatus according to another exemplary embodiment of the present invention. The same reference numerals denote the same elements in different Figures. Thus, in the interest of efficiency, the elements that were described above will not be described again in reference to FIG. 7.

The TFT 219 includes a source electrode 218*a*, a gate electrode 218*b*, a drain electrode 218*c* and a semiconductor layer pattern. An interface electrode 230*b*, which is located in the interface region 255, is electrically coupled to the drain electrode 218*c*. The interface electrode 230*b* electrically connects the drain electrode 218*c* to the second electrode. In reference to the plan view of FIG. 7, the interface electrode 230*b* is disposed at the lower and right corner of the interface region 255. In this embodiment, the interface electrode 230*b* is located at a corner of the interface region 255 that is farthest away from the gate electrode 218*b*. The interface electrode 230*b* has a right-triangular shape. This shape and location of the interface electrode 230*b* is effective for when the rubbing direction is substantially diagonal with respect to the transmissive region 260 of FIG. 7. For example, the interface electrode 230*b* shaped and located as described above is effective when the alignment film is rubbed from the lower right corner to the upper left corner of the opening 229 (in reference to the plan view of FIG. 7) because the lower right corner is difficult to rub properly. With this rubbing direction, light leakage and afterimage problems are the worst near the lower right corner of the opening 229. By forming the interface electrode 230*b* near the area where light leakage occurs, the most dramatic effect can be achieved. Although not shown, alignment films are disposed on the first and second members 270 and 280.

The exact degree of light leakage and afterimage depends on the rubbing direction. When the interface electrode 230*b* is disposed in the interface region 255, light leakage and afterimage are significantly reduced.

Figure 8:
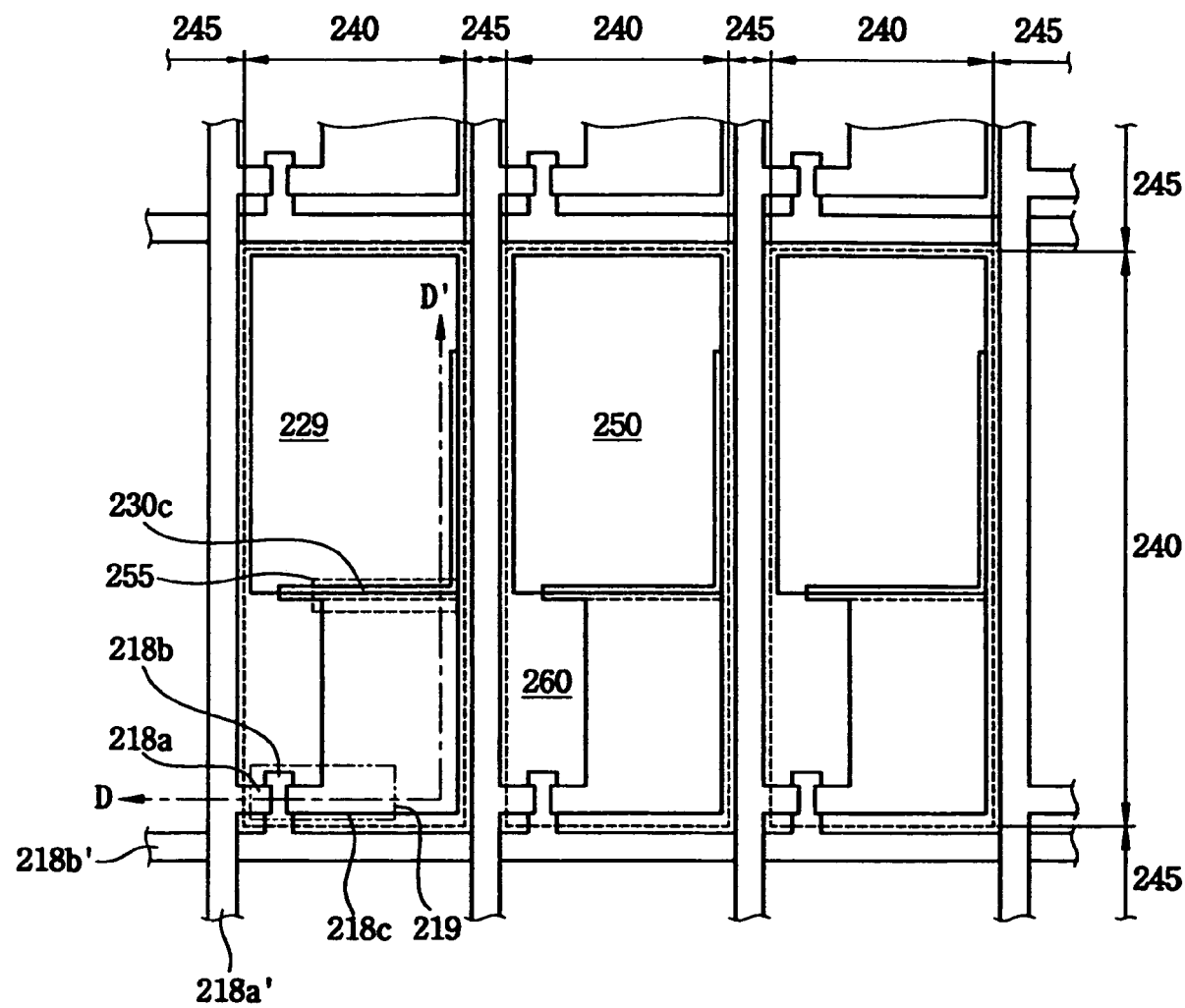
FIG. 8 is a plan view showing an LCD apparatus according to another exemplary embodiment of the present invention.

FIG. 8 is a plan view showing an LCD apparatus according to another exemplary embodiment of the present invention. In the embodiment of FIG. 8, the TFT 219 includes a source electrode 218*a*, a gate electrode 218*b*, a drain electrode 218*c*, a semiconductor layer pattern and an interface electrode 230*c*. A interface electrode 230*c* is electrically coupled to the drain electrode 218*c*, thereby creating an electrically connection between the drain electrode 218*c* and a second electrode 212. The interface electrode 230*c* is disposed adjacent to a lower right corner of the transmissive region 250, and has a mirror-image L-shape. The interface electrode 230*c* extends across the interface region 255 and continues around the corner to extend in a direction parallel to the source line 218*a*', forming a '⌐' shape. This configuration of the interface electrode 230*c* is effective when the rubbing direction is diagonal with respect to the opening 229, from a lower right corner of the opening 229 to an upper left corner of the opening 229.

For the reasons described above, an LCD apparatus that includes an interface electrode disposed at the lower right corner of the opening 229 (in reference to FIG. 7 and FIG. 8) shows decreased light leakage and afterimage. When the rubbing direction is from the lower right corner to the upper left corner of the opening 229 as seen on a plan view, the interface electrode 230*c* may have the angled shape depicted in FIG. 8. However, the position and the shape of the interface electrode 230*c* may be independent of the rubbing direction. A person of ordinary skill in the art will understand how to adjust the shape and position of the interface electrode 230*c* to achieve the most dramatic reduction of light leakage and afterimage.

Figure 9:
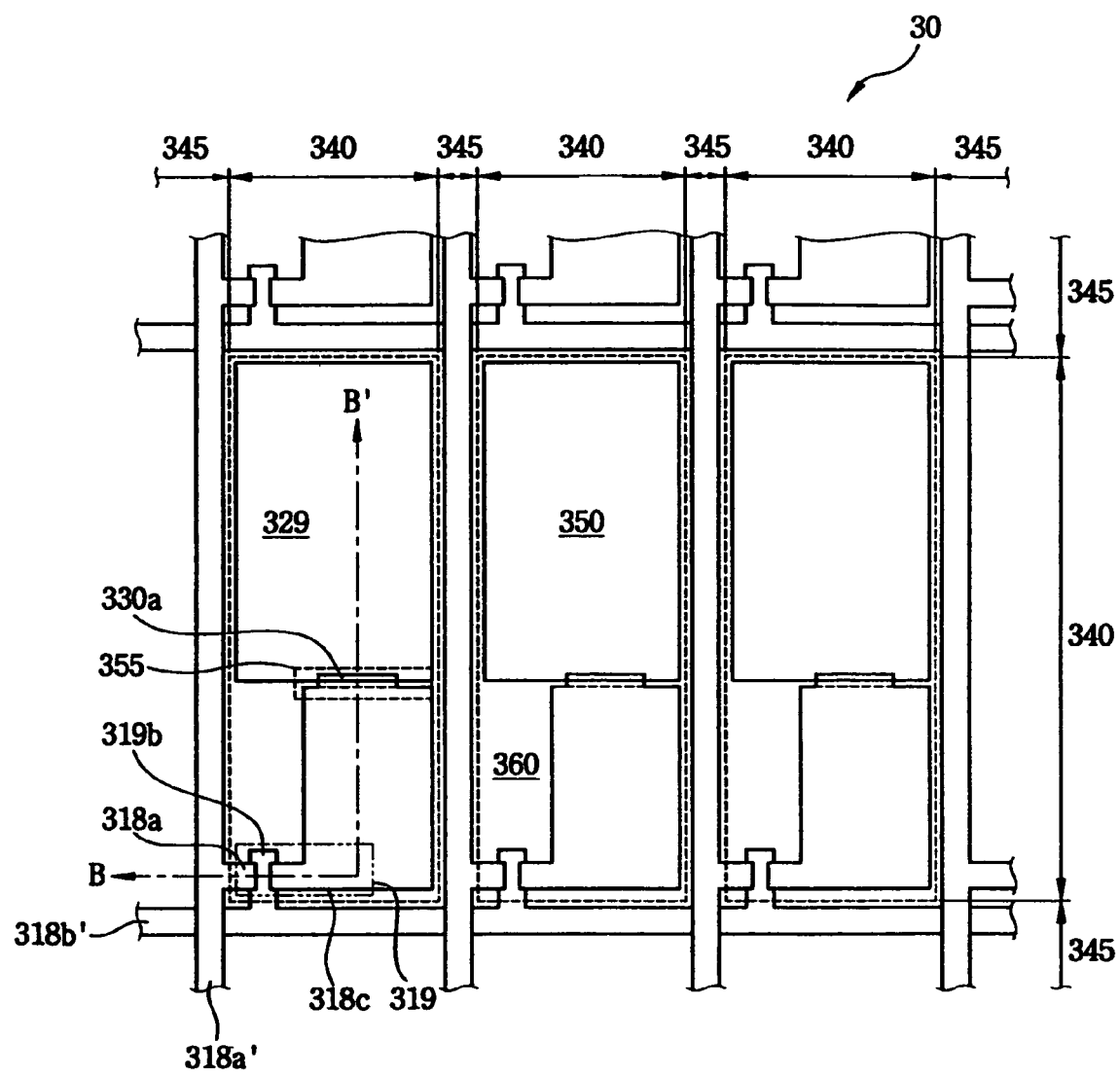
FIG. 9 is a plan view showing an LCD apparatus according to another exemplary embodiment of the present invention.
Figure 10:
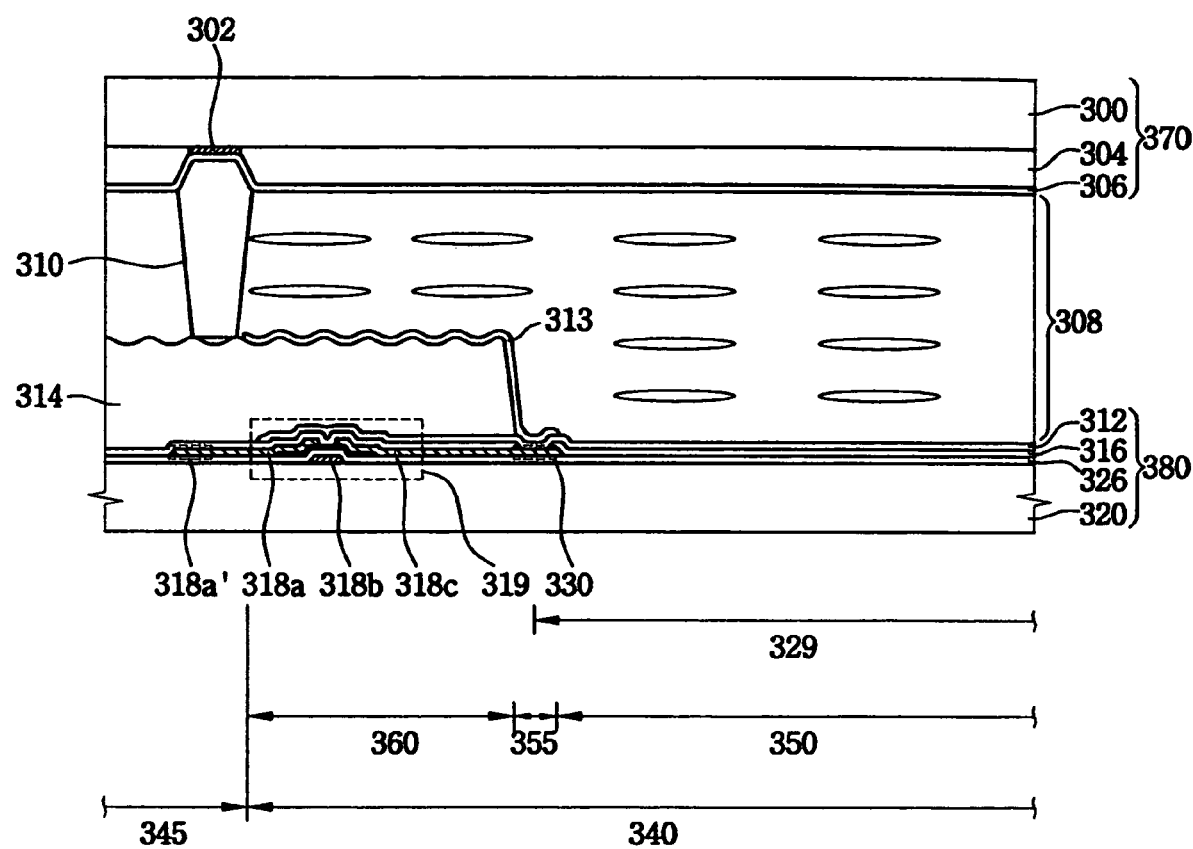
FIG. 10 is a cross-sectional view showing an LCD apparatus according to another exemplary embodiment of the present invention.

FIG. 9 is a plan view showing an LCD apparatus 30 according to a second exemplary embodiment of the present invention, and FIG. 10 is a cross-sectional view of the LCD apparatus 30. Unlike the first embodiment shown in FIG. 3 and FIG. 4, where the second electrode 112 climbs up the sidewall in the interface region 255 and covers the organic layer 114, the second electrode is located under the organic layer in the second embodiment.

Referring to FIGS. 9 and 10, the LCD apparatus 30 includes a first member 370, a second member 380 and a liquid crystal layer 308. The first member 370 includes a first substrate 300, a black matrix 302, a color filter 304, a first electrode 306 and a spacer 310. The second member 380 includes a second substrate 320, a TFT 319, a gate insulating layer 326, a passivation layer 316, an organic layer 314, a second electrode 312, and a reflective electrode 313. The second member 380 includes a transmissive region 350, a reflective region 360, and an interface region 355 located therebetween. Unlike the embodiment shown in FIG. 4, in which the second electrode was deposited after the organic layer, the second electrode 312 is deposited before the organic layer 314 in this embodiment.

The TFT 319 is formed in the reflective region 360 of the second substrate 320 and includes a source electrode 318a, a gate electrode 318b, a drain electrode 318c, and a semiconductor layer pattern.

The interface electrode 330a is disposed in the interface region 355 so that it is adjacent to the drain electrode 318c. In the embodiment shown, the interface electrode 330a has a rectangular shape and extends in a direction parallel to the gate line 318b'.

The passivation layer 316 is disposed on the second substrate 320 having the TFT 319 and includes an opening so that the interface electrode 330a is not entirely covered by the passivation layer 316.

The second electrode 312, which is disposed on the passivation layer 316 and the interface electrode 330a, is electrically coupled to the interface electrode 330a. When a voltage is applied between the second electrode 312 and the first electrode 306, the arrangement of liquid crystals in the liquid crystal layer 308 is controlled. Thus, the transmittance of light through the liquid crystal layer 308 may be manipulated by adjusting the voltage.

The organic layer 314 is disposed on the passivation layer 316 in the reflective region 360 and on a portion of the second electrode 312 so as to electrically insulate the TFT 319 from the reflective electrode 313. As shown, the thickness of the organic layer 314 in the reflective region 360 is different from the thickness of the organic layer 314 in the transmissive region 350. The thickness of the liquid crystal layer 308, and therefore the cell gap, is determined by the thickness of the organic layer 314. Thus, the thicknesses of the organic layer 314 in the different regions are selected to achieve a predetermined first cell gap C1 in the reflective region 360 and a predetermined second cell gap C2 corresponding to the transmissive region 350. Optionally, a pattern is formed on the organic layer 314. The pattern increases the reflectance of the reflective electrode 313, as mentioned above.

The reflective electrode 313 is disposed on the organic layer 314 and on the portion of the second electrode 312 in the interface region 355 so as to reflect light coming from a source that is external to the LCD apparatus. The reflective electrode 313 is deposited conformally to maintain the pattern formed on the organic layer 314, such that the directions in which light is reflected are controlled by the angles in the pattern. The reflective electrode 313 includes a conductive material and is electrically coupled to the drain electrode 318c through the second electrode 312 and the interface electrode 330.

The surfaces of the first and second members 370 and 380 are rubbed in a rubbing direction. The rubbing direction is generally parallel to the direction in which the source line 318a' extends.

Figure 11A:
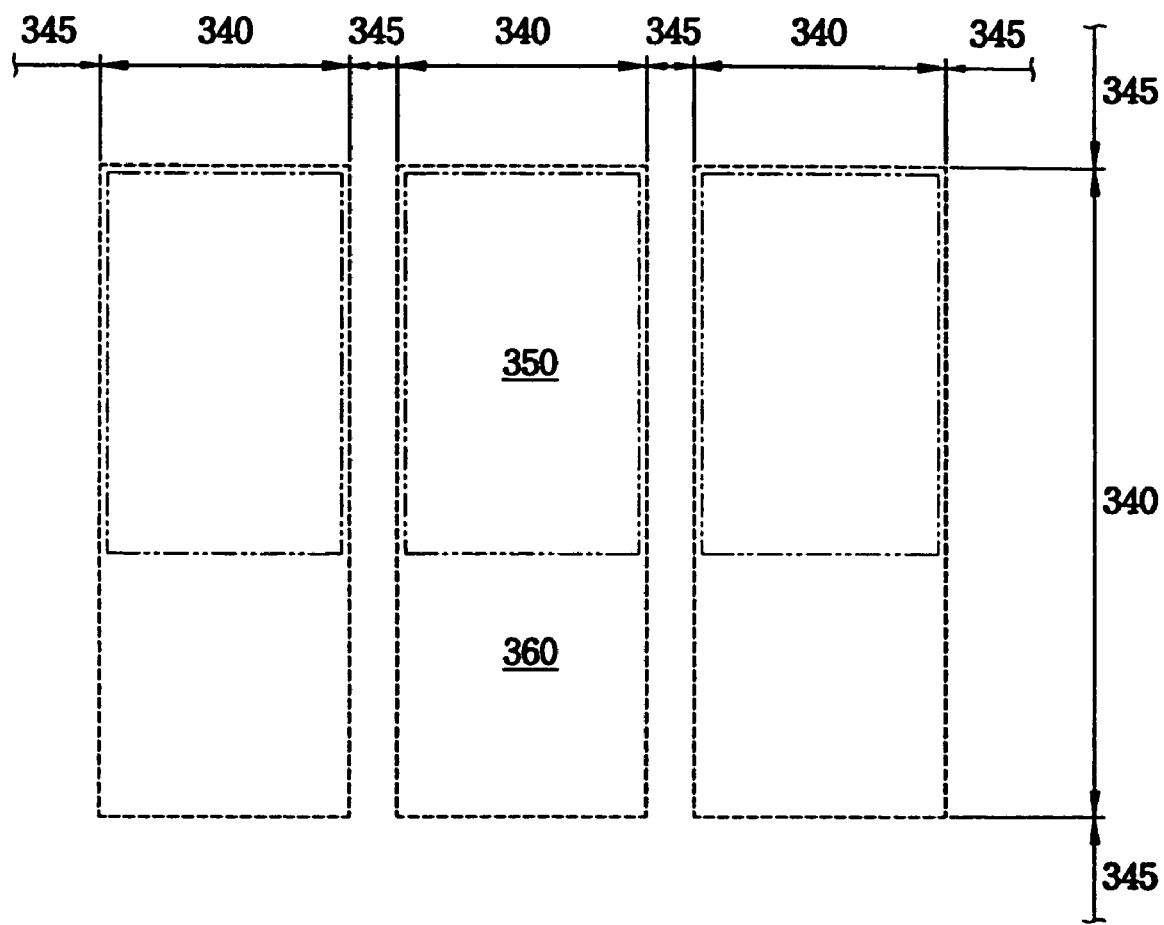
FIGS. 11A to 11C are plan views showing a method of manufacturing an LCD apparatus according to another exemplary embodiment of the present invention.
Figure 11B:
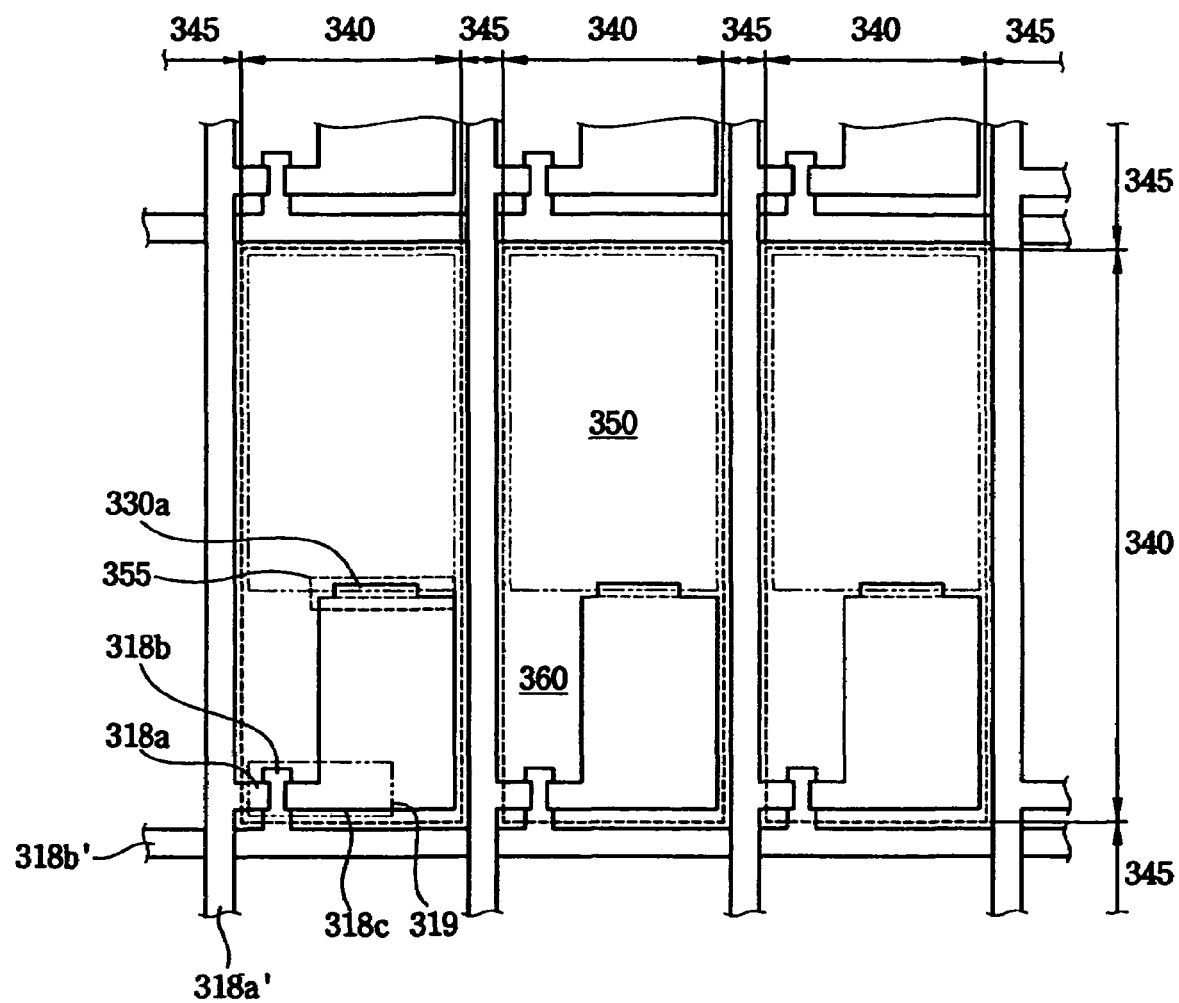
Figure 11C:
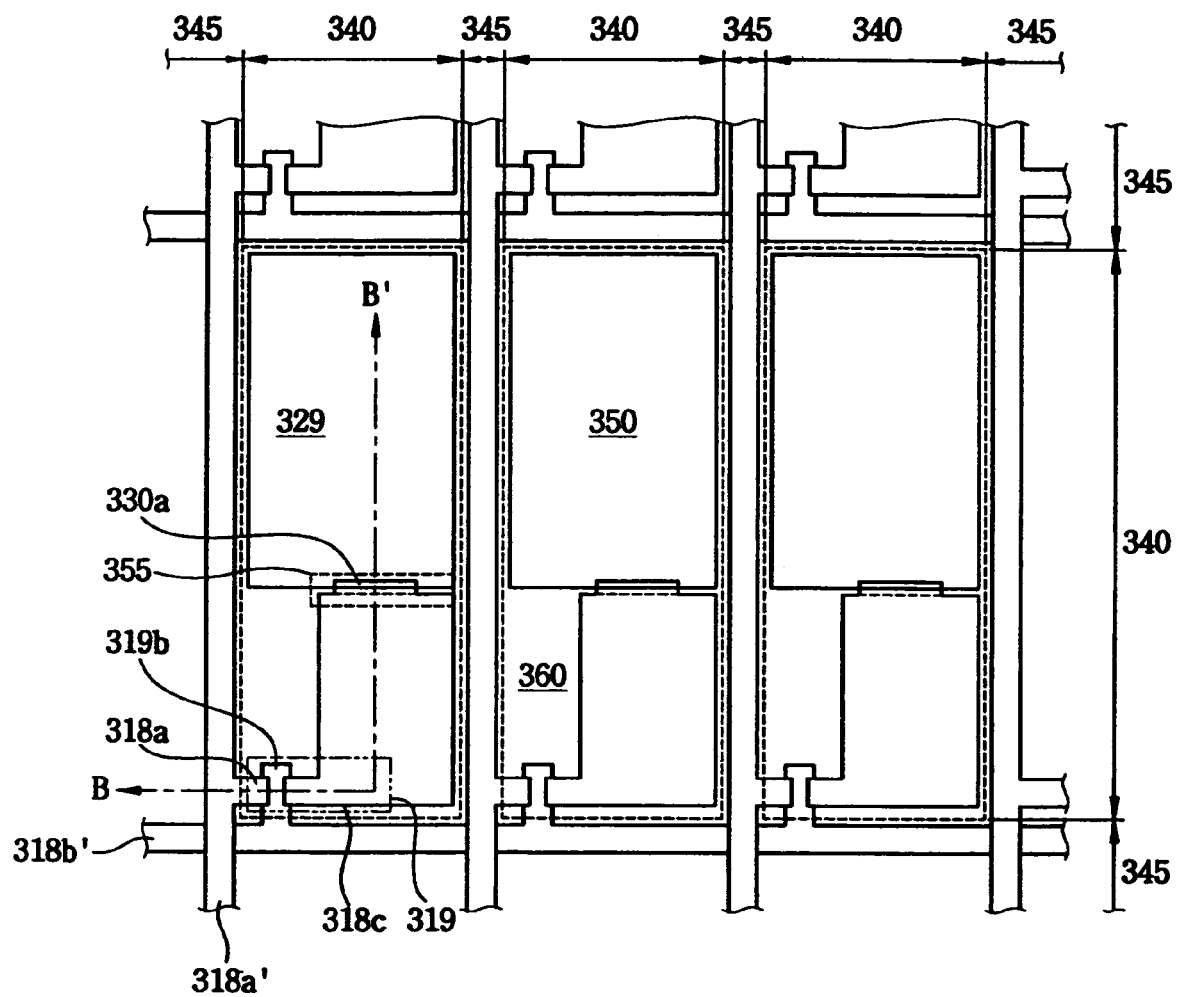
Figure 12A:
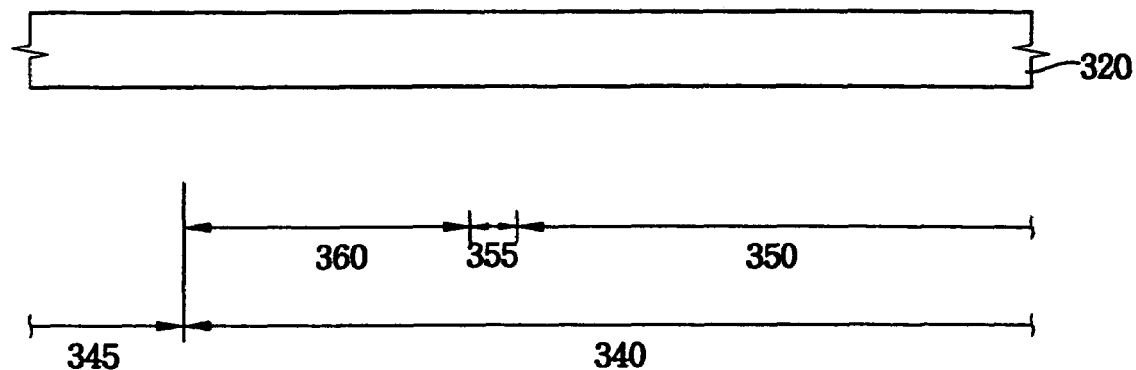
FIGS. 12A to 12G are cross-sectional views showing a method of manufacturing an LCD apparatus according to another exemplary embodiment of the present invention.
Figure 12B:
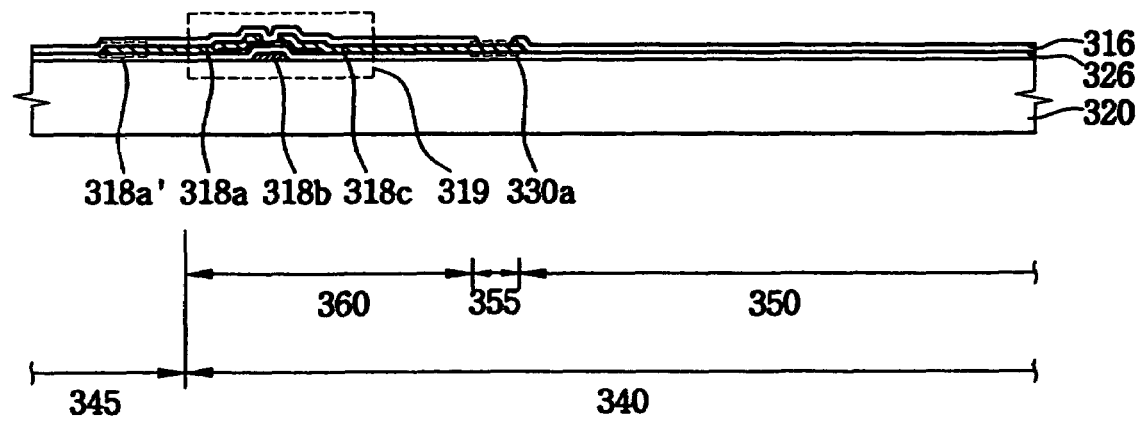
Figure 12C:
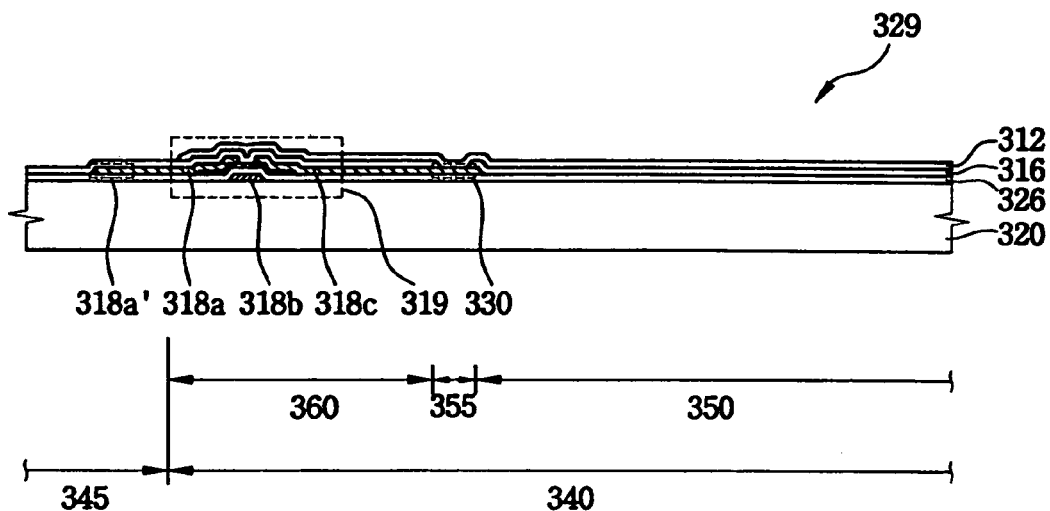

FIGS. 11A, 11B, and 11C are plan views showing a method of manufacturing the LCD apparatus 300, and FIGS. 12A to 12C are cross-sectional views showing the method of FIGS. 11A, 11B, and 11C.

Referring to FIGS. 11A and 12A, the transmissive region 350, which transmits the light from the backlight assembly (not shown), and the reflective region 360, which reflects the light from an external source, are defined in the second substrate 320. Referring to FIGS. 11 B and 12B, the TFT 319 is formed on the second substrate 320. The passivation layer 316 is formed on the second substrate 320 having the TFT 319, but in a way that it does not completely cover the interface electrode 330a. As shown, at least a part of the interface electrode 330a is exposed through an opening in the passivation layer 316 at this stage of the process.

Referring to FIG. 12C, a transparent conductive material is deposited on the passivation layer 316. The transparent conductive material may contain ITO. The deposited transparent conductive material is partially etched to form the second electrode 312. The second electrode 312 is formed in the transmissive region 350 and the interface electrode 330a. In some embodiments, a film of the deposited transparent material may remain on the passivation layer 316 in the reflective region 360.

Figure 12D:
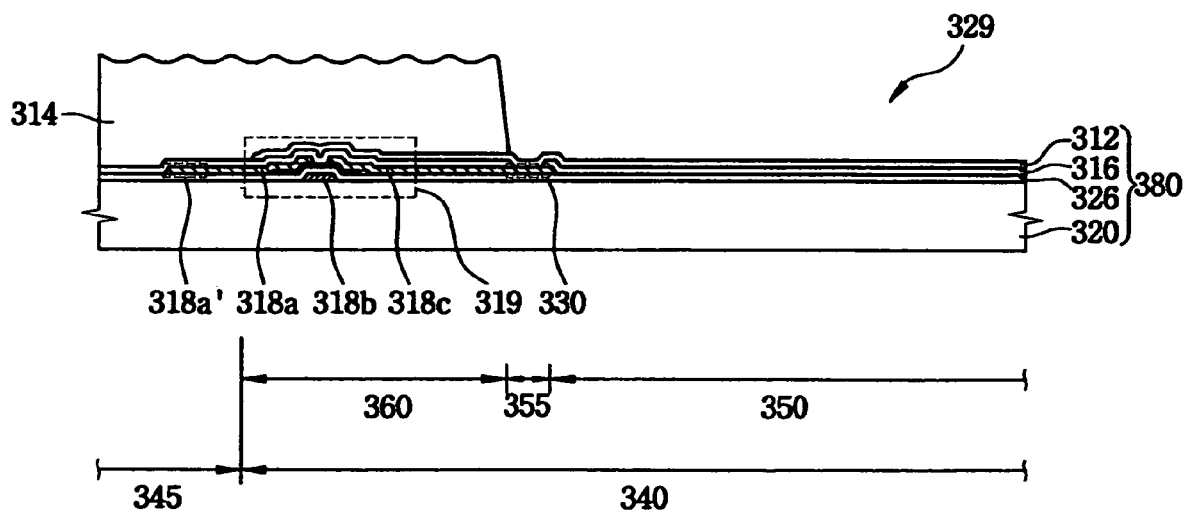

Referring to FIG. 12D, an organic material (e.g., a photoresist) is coated on the passivation layer 316 and the second electrode 312. The coated organic material is then exposed and developed to be removed from the transmissive region 350, forming the organic layer 314 with recesses and protrusions on its surface. The interface electrode 330a and the transmissive region 350 are exposed through the opening 329. The recesses and protrusions are formed on the organic layer 314, for example by using a mask that includes a translucent part and a transparent part. Slits may be present in the translucent parts of the mask.

Figure 12E:
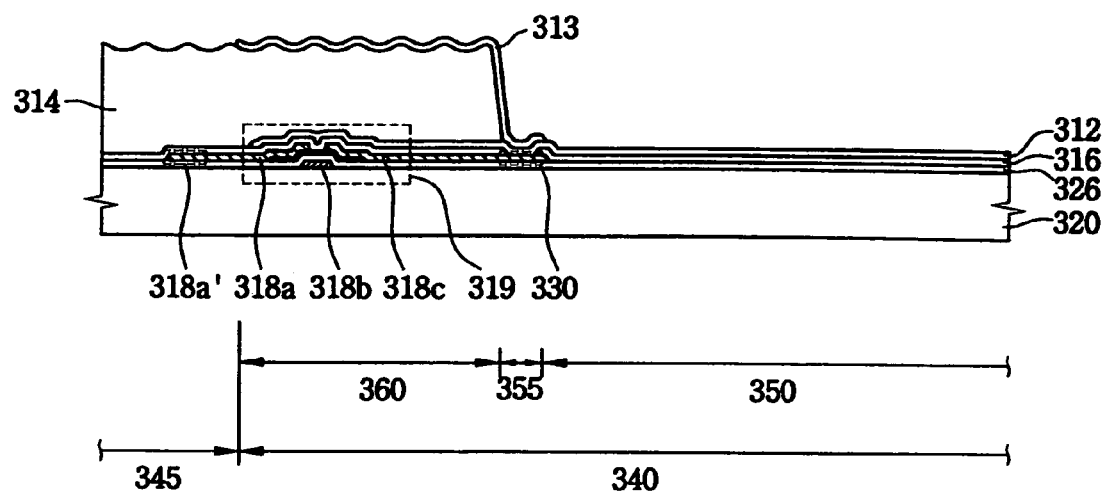

Referring to FIG. 12E, a conductive material having a high reflectance is deposited on the organic layer 314 and the second electrode 312. The conductive material may include multiple layers, for example a molybdenum-tungsten alloy layer and an aluminum-neodymium layer that are consecutively deposited. The deposited conductive material is partially etched to form the reflective electrode 313 having the multi-layered structure in the reflective region 360. The reflective electrode 313 is electrically connected to the drain electrode 318c through the second electrode 312 and the interface electrode 330a.

Figure 12F:
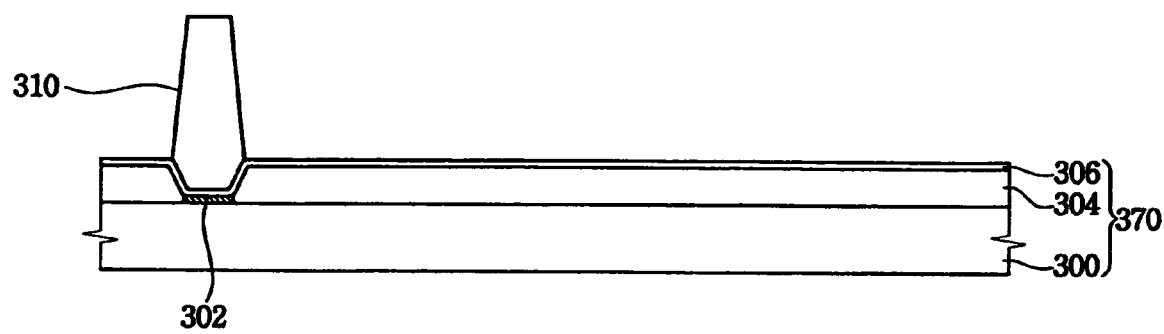

Referring to FIG. 12F, the black matrix 302, the color filter 304, the first electrode 306, and the spacer 310 are formed on the first substrate 300 to form the first member 370.

Figure 12G:
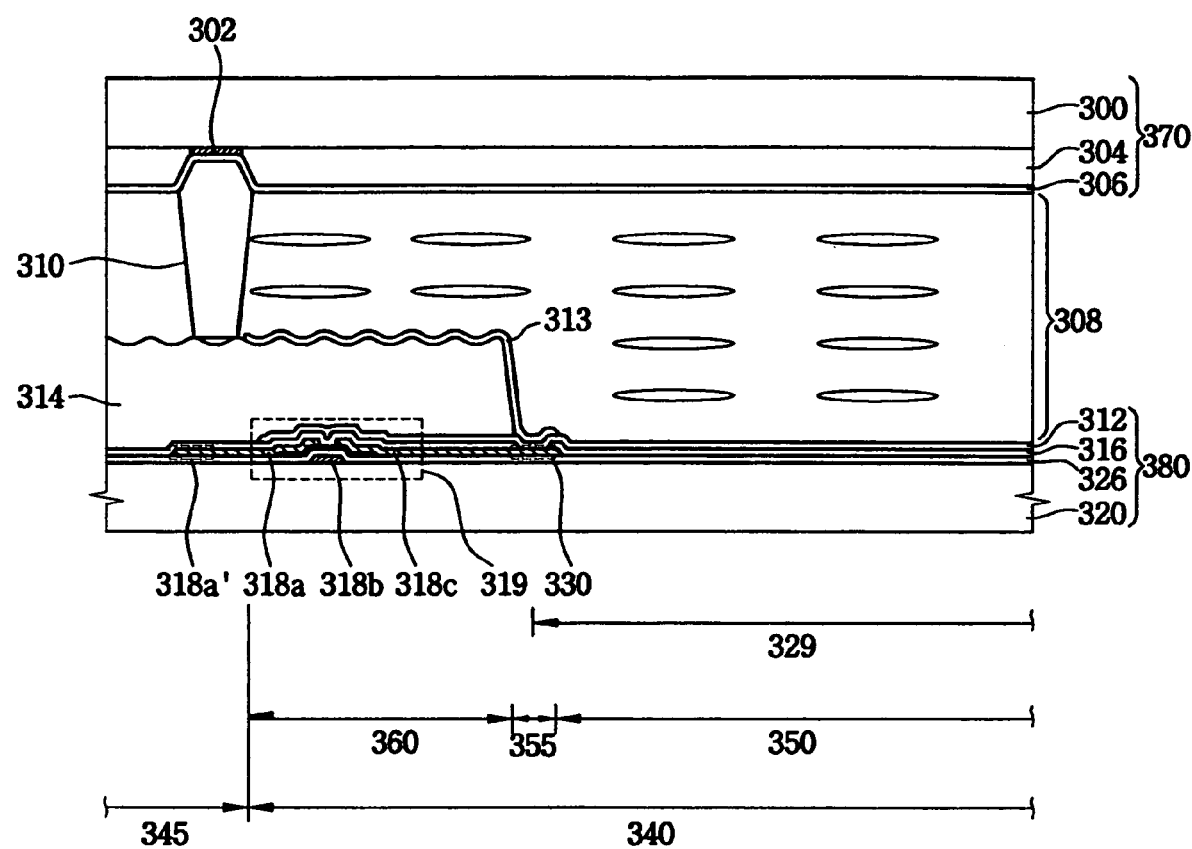

As shown in FIG. 12G, the first member 370 is combined with the second member 380, and the liquid crystal layer 308 is interposed between the first and second members 370 and 380. The liquid crystal layer 308 may be formed through a vacuum injection process or a dropping process, both of which are well-known.

When the rubbing direction is substantially parallel to the source line 318a', the LCD apparatus benefits from the interface electrode 330a that has a rectangular shape and extends in the direction parallel to the direction in which the gate line 318b' extends. The interface electrode 330a decreases light leakage and afterimage of the LCD apparatus.

Experiment 1

The reflectances of conventional LCD apparatuses 100 having contact holes were compared to the reflectances of LCD apparatuses built according to the invention. In the tables below, the LCD apparatuses having contact holes are indicated with odd numbers and the LCD apparatuses built according to the invention are indicated by even numbers. For the apparatus that are built according to the invention, the interface electrodes had rectangular shapes extending in a plane parallel to the gate line 218b'.

The conventional LCD apparatuses that have contact holes were similar to the LCD apparatus built according to the invention except for the presence of contact holes and absence of the interface electrodes. The sizes of the contact holes were substantially equal to the sizes of the interface electrodes.

Patterns of recesses and protrusions were formed on the organic layers in the LCD apparatuses. The recesses and protrusions were formed by using well-known exposing and developing processes. The reflectance was measured and recorded for various exposure times. Table 1 shows the reflectances of the LCD apparatus with contact holes for various exposure times.

TABLE 1

Reflectance of LCD apparatuses having contact holes

| Exposing Time Cell No. | 1,000 ms | 1,400 ms | 1,600 ms | 1,800 ms | 2,000 ms |
|---|---|---|---|---|---|
| 1 | 11.4 | | | 14.9 | |
| 3 | | 18.1 | 19.6 | 15.1 | 12.9 |
| 5 | 5.7 | | 19.7 | 15.1 | |
| 7 | | | 19.1 | | |
| 11 | | 19.7 | | | 10.4 |
| 13 | 9.8 | | 16.7 | | 11.1 |
| 15 | 11.3 | 19.5 | 16.6 | 13.4 | 10.4 |
| 17 | 11 | | 16.5 | | |
| 21 | | | | | 10.7 |
| 23 | | | | 13.3 | |
| 25 | 10.8 | 19.6 | 18 | 13 | |
| 27 | 10.3 | | 18.2 | | |
| Average (%) | 10.0 | 19.2 | 18.1 | 14.1 | 11.1 |
| Maximum value (%) | 11.4 | 19.7 | 19.7 | 15.1 | 12.9 |

When the exposing times were 1,000 ms, 1,400 ms, 1,600 ms, 1,800 ms and 2,000 ms, the average reflectances were 10.0%, 19.2%, 18.1%, 14.1% and 11.1%, respectively. According to the results, the optimum exposure time was 1,400 ms. With the exposure time of 1,400 ms, the reflectance was 19.2%.

Table 2 shows the reflectance of the LCD apparatuses that are built according to the invention, at various exposure times.

TABLE 2

Reflectance of LCD apparatuses built according to the invention

| Exposing Time Cell No. | 1,000 ms | 1,400 ms | 1,600 ms | 1,800 ms | 2,000 ms |
|---|---|---|---|---|---|
| 2 | 3.7 | | 19.2 | 13.8 | 12.4 |
| 4 | 2.9 | | | 16 | |
| 6 | 3 | | 21.2 | | |
| 8 | 4.7 | | | | |
| 12 | 4.6 | 20.5 | 18.1 | 12 | 11.7 |
| 14 | | 21.1 | 18.8 | 11.7 | 11.9 |
| 16 | 3.8 | 20.4 | 18.7 | 11.9 | 11.9 |
| 18 | | 20.5 | 19.5 | 12.3 | |
| 22 | 11.5 | 21.4 | | 12.9 | |
| 24 | 3.9 | 21.8 | | 12.4 | 11.7 |
| 26 | 3.2 | 21.4 | 19.2 | 12.8 | |
| 28 | 3.1 | | 20.1 | 12.4 | |
| Average (%) | 4.4 | 21.0 | 19.4 | 12.8 | 11.9 |
| Maximum value (%) | 11.5 | 21.8 | 21.2 | 16 | 12.4 |

At exposure times of 1,000 ms, 1,400 ms, 1,600 ms, 1,800 ms and 2,000 ms, the average reflectance was 4.4%, 21.0%, 19.4%, 12.8% and 11.9%, respectively. According to the results, the optimum exposure time was 1,400 ms. When the exposure time was 1,400 ms, the reflectance was 21.0%.

A comparison of the values in Table 1 to the values in Table 2 indicates that the optimum reflectance was increased from 19.2% to 21.0% by eliminating the contact hole. As mentioned above, the size of the contact hole for the apparatuses in Table 1 was similar to the size of the interface electrodes in the apparatuses of Table 2.

In some embodiments, the interface electrode may be made larger than the contact hole to effectively prevent light leakage and afterimage from occurring near the interface between the transmissive region and the reflective region.

The experimental results confirm that LCD apparatuses including the interface electrodes generally show improved reflectance due to decreased light leakage and afterimage. In addition, when the second electrode is positioned under the organic layer, the reflective electrode is electrically connected to the interface electrode, thereby enhancing light transmittance. Overall, the display quality of the LCD apparatus is improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display apparatus comprising:
a first substrate having a reflective region and a transmissive region including a transparent electrode;
a second substrate including a transparent common electrode;
a liquid crystal layer located between the first substrate and the second substrate; and
a thin film transistor including a gate electrode, a source electrode, and a drain electrode, wherein the gate electrode is located in the reflective region and wherein one of the source electrode and the drain electrode contacts the transparent electrode between the reflective region and the transmissive region.

2. The apparatus of claim 1, further comprising a reflective electrode positioned in the reflective region, wherein the reflective electrode is electrically coupled to the thin film transistor between the reflective region and the transmissive region.

3. The apparatus of claim 2, further comprising an organic layer positioned between the reflective electrode and the thin film transistor so that the organic layer forms a sidewall between the reflective region and the transmissive region, wherein the reflective electrode covers the sidewall and a portion of the organic layer in the reflective region.

4. The apparatus of claim 3, wherein the transparent electrode covers the transmissive region, the sidewall, and a portion of the organic layer in the reflective region.

5. The apparatus of claim 4, wherein the transparent electrode is located between the reflective electrode and the thin film transistor.

6. The apparatus of claim 3, wherein the organic layer has a patterned surface and the reflective electrode is conformally coated on the patterned surface.

7. The apparatus of claim 3, wherein the transparent electrode is in the reflective region and the transmissive region, and wherein the transparent electrode in the reflective region is covered by the organic layer.

8. The apparatus of claim 2, wherein the reflective electrode comprises at least one of a silver layer, a silver alloy layer, a molybdenum-tungsten alloy layer, and an aluminum-neodymium layer.

9. The apparatus of claim 1, wherein the reflective region and the transmissive region are located in a pixel region of the apparatus that is defined by signal lines.

10. The apparatus of claim 1, further comprising a color filter coupled to one of the first and second substrates for filtering light of a predetermined wavelength range.

11. The apparatus of claim 1, wherein the reflective region has a first cell gap and the transmissive region has a second cell gap, and wherein the second cell gap is approximately twice as large as the first cell gap.

12. The apparatus of claim 1, further comprising a signal line that forms a border between the reflective region and the transmissive region, wherein the one of the source electrode and the drain electrode is contacted with the transparent electrode at the border.

13. A display apparatus comprising:
- a first substrate having a reflective region, a transmissive region including a transparent electrode, and an interface region located between the reflective region and the transmissive region;
- a second substrate including a transparent common electrode;
- a liquid crystal layer located between the first substrate and the second substrate; and
- a thin film transistor formed in the reflective region, wherein the thin film transistor has a gate electrode that is located in the reflective region, and wherein the thin film transistor contacts the transparent electrode in the interface region.

14. The apparatus of claim 13, wherein an electrode of the thin film transistor extends from the reflective region to the interface region to form an interface electrode in the interface region, wherein the interface electrode is electrically connected to the transparent electrode.

15. The apparatus of claim 14, wherein the interface electrode is shaped and positioned to prevent light leakage in the interface region.

16. The apparatus of claim 14, wherein the interface electrode extends across the interface region.

17. The apparatus of claim 16, wherein the interface electrode has a substantially rectangular shape.

18. The apparatus of claim 14, wherein a shape and a position of the interface electrode are adjusted according to a rubbing direction of the apparatus.

19. The apparatus of claim 18, wherein the interface electrode has a substantially triangular shape or a substantially L-shape.

20. The apparatus of claim 14, further comprising a signal line that forms a border between the reflective region, the transmissive region and the interface region, wherein the interface electrode is located at the border.

* * * * *